(12) United States Patent
Terry

(10) Patent No.: US 12,338,078 B1
(45) Date of Patent: Jun. 24, 2025

(54) SMART INDIVIDUAL MOTION CAPTURE AND SPATIAL TRANSLATION (SIMCAST) SYSTEM WITH TENSILE-FLEX MESH-TREAD (TFMT) MOTION SURFACE

(71) Applicant: Walter L. Terry, Fair Oaks, CA (US)

(72) Inventor: Walter L. Terry, Fair Oaks, CA (US)

(*) Notice: Subject to any disclaimer, the term of this patent is extended or adjusted under 35 U.S.C. 154(b) by 0 days.

(21) Appl. No.: 18/607,828

(22) Filed: Mar. 18, 2024

Related U.S. Application Data

(63) Continuation-in-part of application No. 18/218,487, filed on Jul. 5, 2023, now Pat. No. 11,954,246.

(60) Provisional application No. 63/358,736, filed on Jul. 6, 2022.

(51) Int. Cl.
B65G 43/00 (2006.01)
H04N 23/90 (2023.01)

(52) U.S. Cl.
CPC ............. *B65G 43/00* (2013.01); *H04N 23/90* (2023.01)

(58) Field of Classification Search
CPC ................................ B65G 43/00; H04N 23/90
See application file for complete search history.

(56) References Cited

U.S. PATENT DOCUMENTS

| | | | | |
|---|---|---|---|---|
| 4,548,405 A * | 10/1985 | Lee | ......................... | A63B 22/02 482/54 |
| 5,562,572 A * | 10/1996 | Carmein | ................ | A63B 22/02 198/779 |
| 5,643,144 A * | 7/1997 | Trulaske | ................ | A63B 22/02 198/841 |
| 5,951,441 A * | 9/1999 | Dalebout | ........... | A63B 22/0207 198/844.2 |
| 6,743,154 B2 | 6/2004 | Epstein | | |
| 6,836,286 B1 * | 12/2004 | Tachi | ....................... | H04N 7/15 348/E7.083 |

(Continued)

FOREIGN PATENT DOCUMENTS

| EP | 3157644 B1 | 5/2016 |
|---|---|---|
| KR | 20190073987 A | 6/2019 |

(Continued)

OTHER PUBLICATIONS

"The Future of Gaming is Here," invest.virtuix.com. https://invest.virtuix.com/ [Date accessed: Mar. 21, 2022].

(Continued)

*Primary Examiner* — William Lu
(74) *Attorney, Agent, or Firm* — Bold IP, PLLC; Houda El-Jarrah; Troy Schmelzer

(57) ABSTRACT

A motion capture and spatial translation system comprises an infinite directional travel platform (IDTP) that includes a vessel having an elliptical lower body and a flat upper body, a treadmill motion surface encapsulating the vessel, and a host frame supporting the IDTP and anchoring wheels that induce movement of the treadmill motion surface relative to the vessel. The treadmill motion surface comprises an inner layer formed from an elastic material; an intermediate layer formed from patches having inelastic compression properties that increase a modulus of elasticity and decrease elongation of the elastic material; and an outer layer formed from the elastic material and having embedded materials that increase a coefficient of friction at an exterior surface of the treadmill motion surface.

18 Claims, 21 Drawing Sheets

(56) References Cited

U.S. PATENT DOCUMENTS

| | | | |
|---|---|---|---|
| 7,140,485 B1* | 11/2006 | Chang | A63B 22/02 |
| | | | 482/54 |
| 7,780,573 B1* | 8/2010 | Carmein | A63B 71/0622 |
| | | | 482/4 |
| 7,878,284 B1* | 2/2011 | Shultz | B60C 7/22 |
| | | | 180/199 |
| 8,276,701 B2* | 10/2012 | Shultz | B60C 7/22 |
| | | | 180/9.1 |
| 9,039,579 B1* | 5/2015 | Osime | A63B 22/14 |
| | | | 482/54 |
| 9,394,959 B2* | 7/2016 | Nauman | C08L 83/04 |
| 9,498,696 B1* | 11/2016 | Razon | A63B 22/0046 |
| 10,010,748 B1* | 7/2018 | Weinstein | A63B 22/0285 |
| 10,231,662 B1 | 3/2019 | Berme et al. | |
| 10,286,313 B2 | 5/2019 | Goetgeluk et al. | |
| 10,390,736 B1* | 8/2019 | Berme | G09G 5/14 |
| 10,444,827 B2* | 10/2019 | Bahrami | G06F 3/011 |
| D870,730 S | 12/2019 | Wang | |
| D870,827 S | 12/2019 | Wang | |
| 10,493,317 B2* | 12/2019 | Chen | G06F 3/011 |
| 10,603,577 B2* | 3/2020 | Matina | A63F 13/285 |
| 10,946,236 B2* | 3/2021 | Rudelstorfer | A63B 69/0028 |
| 10,955,907 B2 | 3/2021 | Chong et al. | |
| 11,176,844 B2* | 11/2021 | Platt | G09B 9/302 |
| 2002/0193556 A1* | 12/2002 | Kitahara | C08L 23/16 |
| | | | 528/272 |
| 2003/0134927 A1* | 7/2003 | Sulzbach | C08F 283/006 |
| | | | 522/92 |
| 2003/0143925 A1* | 7/2003 | Yang | B24B 37/205 |
| | | | 451/6 |
| 2003/0176828 A1* | 9/2003 | Buckman | A61F 13/00063 |
| | | | 602/57 |
| 2004/0048722 A1* | 3/2004 | Epstein | G06F 3/011 |
| | | | 482/54 |
| 2005/0209060 A1* | 9/2005 | Lull | A63B 22/0235 |
| | | | 482/52 |
| 2006/0139317 A1* | 6/2006 | Leu | G06F 3/016 |
| | | | 345/156 |
| 2007/0219066 A1* | 9/2007 | Wang | A63B 22/0235 |
| | | | 482/54 |
| 2007/0270285 A1* | 11/2007 | Gill | A63B 22/02 |
| | | | 482/54 |
| 2009/0111670 A1* | 4/2009 | Williams | A63B 23/0464 |
| | | | 482/146 |
| 2009/0233746 A1* | 9/2009 | Leighton | B65G 15/34 |
| | | | 474/268 |
| 2010/0035731 A1* | 2/2010 | Rohr | A63B 22/02 |
| | | | 482/54 |
| 2012/0021875 A1* | 1/2012 | Karl | A63B 22/0285 |
| | | | 482/54 |
| 2012/0053020 A1* | 3/2012 | Wright | B65G 15/34 |
| | | | 521/137 |
| 2012/0302408 A1* | 11/2012 | Burger | A63B 22/0242 |
| | | | 482/54 |
| 2013/0132910 A1 | 5/2013 | Belmon | |
| 2013/0237378 A1 | 9/2013 | Carrell | |
| 2014/0099472 A1* | 4/2014 | Greenhill | F41H 5/04 |
| | | | 427/532 |
| 2014/0309092 A1* | 10/2014 | De Michele | A63B 21/4033 |
| | | | 482/142 |
| 2015/0080187 A1* | 3/2015 | Beane | A63B 69/0064 |
| | | | 482/51 |
| 2016/0354669 A1* | 12/2016 | Rozenberg | A63B 21/00181 |
| 2017/0333748 A1* | 11/2017 | Becker | A63B 22/0228 |
| 2018/0032126 A1* | 2/2018 | Liu | G06V 10/143 |
| 2018/0050256 A1* | 2/2018 | Buvid | G06T 13/40 |
| 2018/0170678 A1* | 6/2018 | Leong | A63B 22/0285 |
| 2018/0303383 A1* | 10/2018 | Connor | G06F 3/014 |
| 2019/0224521 A1* | 7/2019 | Olsson | A63B 22/0285 |
| 2019/0307982 A1* | 10/2019 | Brodsky | A63B 22/02 |
| 2020/0088758 A1* | 3/2020 | Smoot | H04W 4/027 |
| 2021/0055785 A1* | 2/2021 | Fluture | G06F 3/0304 |
| 2021/0346755 A1* | 11/2021 | Epstein | A63B 22/0235 |
| 2021/0366193 A1* | 11/2021 | Goetgeluk | G11B 27/031 |
| 2022/0134178 A1* | 5/2022 | Lin | D02G 3/12 |
| | | | 482/54 |
| 2022/0252881 A1* | 8/2022 | Wieczorek | G02B 27/017 |
| 2023/0031291 A1* | 2/2023 | Nakamura | A63B 24/0087 |
| 2024/0012469 A1* | 1/2024 | Terry | G06F 3/011 |

FOREIGN PATENT DOCUMENTS

| | | |
|---|---|---|
| KR | 20210023190 A | 3/2021 |
| WO | 2016153442 A1 | 9/2016 |

OTHER PUBLICATIONS

"Infinadeck," infinadeck.com. https://www.infinadeck.com/ [Date accessed: Mar. 21, 2022].

"VR Locomotion Platform for Professionals and Businesses," cyberith.com. https://www.cyberith.com/?gclid=CjwKCAjwqZSIBhBwEiw AfoZUIKmCwPTyQDdd5doXn3H1GpXir2v8m22ovhYN8gbFmIV 9eZwTAs5INBoCMr0QAvD_BwE [Date accessed: Feb. 18, 2022].

"KAT Walk Mini S—VR Treadmill for Business," knoxlabs.com. https://www.knoxlabs.com/products/kat-walk-mini-s [Date accessed: Feb. 18, 2022].

"SpaceWalkerVR: Virtual Reality Walk and Ride Simulators." https://spacewalkervr.com/ [Date accessed: Feb. 18, 2022].

* cited by examiner

SMART INDIVIDUAL MOTION CAPTURE AND SPATIAL TRANSLATION (SIMCAST) SYSTEM WITH TENSILE-FLEX MESH-TREAD (TFMT) MOTION SURFACE

CROSS-REFERENCE TO RELATED APPLICATIONS

This application is a continuation-in-part of U.S. non-provisional patent application Ser. No. 18/218,487, filed on Jul. 5, 2023, and claims the benefit of priority of U.S. provisional patent application No. 63/358,736, filed on Jul. 6, 2022, which incorporated herein by reference.

FIELD OF THE DISCLOSURE

This disclosure relates to a portable machine learning enabled motion translation platform and, in particular, relates to a smart individual motion capture and spatial translation (SIMCAST) system having a tensile-flex mesh-tread (TFMT) motion surface.

BACKGROUND

Physical motion platforms known as 360-degree treadmills are often touted to provide omnidirectional movement. In actuality, many such 360-degree treadmills do not have a moving surface at all or move only in two perpendicular directions. Such treadmills have been described in various contexts and have been suggested as being useful for various entertainment purposes, in particular, the gaming world. However, existing 360-degree treadmills have a number of deficiencies. For one, 360-degree treadmills such as those described in U.S. Pat. No. 7,780,572 are very large and tall and require several steps to reach platform height. Previous 360-degree treadmills generally occupy a great deal of space and are meant to be stationary and semi-permanent installations, making them impractical for many sites. They are generally not portable, cannot be easily moved, and are either static in nature or manually activated. Further, previous 360-degree treadmills with moving floors use switches that are activated by pressure changes of footsteps. Because the user must first take steps in a given direction to activate the switches, the floors of previous 360-degree treadmills tend to be large because they must have adequate space to allow for these additional steps and to allow travel distance to account for the latency of switch-controlled action after perhaps several steps.

Previous 360-degree treadmills have also lacked a motion surface that provides sufficient elastic deformation deform as it moves but without excessive stretching that could cause bunching. Motion surfaces of previous 360-degree treadmills also lack friction-enhancing means for reducing slips by the user.

Accordingly, there is a need for an improved motion translation platform that overcomes these deficiencies.

SUMMARY

This disclosure provides a motion translation platform that is referred to herein as a smart individual motion capture and spatial translation (SIMCAST) system. The motion translation platform of this disclosure incorporates translation of body motions into its feature set and is activated automatically by user motion and/or anticipation of user motion. The motion translation platform uses motor controllers that are activated by predicted path of travel from computer vision (CV) cameras to provide real-time floor movement, allowing use of smaller floors as compared to previous 360-degree treadmills that use switches activated by pressure changes of footsteps.

The motion translation platform of this disclosure is portable, lightweight and uses machine learning and computer vision (CV) to recognize movement and predict movement over a 360-degree range. It translates a user's personal spatial dimensions into digital representations, translates a user's directional movement into directional signal outputs, and sends the digital representations of the user's spatial dimensions and the directional signal outputs to control platform action as well as external devices and technology platforms, to be used for multiple purposes. For example, the motion translation platform may be configured for entertainment purposes, such as virtual reality gaming where a user is fully immersed in a game environment. The motion translation platform may also be used for training purposes, sports, education, virtual tourism, business, and a variety of other purposes.

The motion translation platform of this disclosure may be used for many other purposes including, without limitation: 1) to create a physical model of the individual for use while online shopping in fitting clothes, shoes, sportswear, and other personal wear items; 2) to create and/or animate real-time avatars in business and other settings for meetings, workshops, and other collaborative activities; 3) to portray and animate real world individuals as player characters or avatars in video games; 4) to remotely control physical robots with natural motions; 5) to safely and remotely control drones, machinery, and other equipment; 6) to train personnel in an extended reality (XR) or digital environment in preparation for work or task performance in a real world, physical environment; 7) to remotely view and analyze an individual's motion for physical therapy and other medical purposes; 8) to remotely view and analyze an individual's motion for sports medicine and coaching purposes; 9) to create 3D personal or professional videos for use in XR and digital media archives, for use in legal testimony or records, and/or for family historical purposes and communication with surviving posterity; 10) to achieve physical exercise objectives; and 11) to perform virtual tourism.

The motion translation platform of this disclosure further provides a multi-layered tensile-flex mesh-tread (TFMT) motion surface that is able to elastically deform as it surrounds and orbits a vessel but without excessive stretching that could cause bunching. The TFMT motion surface also provides an increased coefficient of friction at its external surface to reduce slips by the user as well as to increase the grip of motorized wheels that move the TFMT motion surface.

Accordingly, one aspect of this disclosure is a motion capture and spatial translation system comprising an infinite directional travel platform (IDTP). The IDTP includes a vessel having an elliptical lower body and a flat upper body, a treadmill motion surface that encapsulates the hollow vessel, and a host frame that supports the IDTP and anchors wheels that induce movement of the treadmill motion surface relative to the vessel. The treadmill motion surface comprises an inner layer formed from an elastic material; an intermediate layer formed from patches having inelastic compression properties that increase a modulus of elasticity and decrease elongation of the elastic material; and an outer layer formed from the elastic material and having embedded materials that increase a coefficient of friction at an exterior surface of the treadmill motion surface.

In some embodiments, the elastic material is polyurethane rubber. In some examples, the inner layer and the outer layer are formed by brush coating liquid polyurethane rubber over the vessel.

In some embodiments, the patches are formed from a coated polyester mesh having surface perforations to maintain adhesion to the inner layer and the outer layer.

In some embodiments, each of the patches comprises a plurality of fingers projecting in radial symmetry from a circular central area. In some examples, the fingers are formed with bulbous ends to improve their anchorage in the elastic material of the inner layer and the outer layer.

In some embodiments, the patches are arranged in the intermediate layer such that the fingers interlock with each other. In some examples, the patches are arranged linearly and interlockingly across the flat upper body of the vessel and around the elliptical lower body of the vessel.

In some embodiments, the embedded materials of the outer layer comprise ethylene propylene diene monomer (EPDM) granules or styrene-butadiene rubber (SBR) granules.

In some embodiments, the IDTP further comprises an intervening layer of lubricant fluid between the treadmill motion surface and the vessel, and a port integrated within the vessel to define an enclosed channel extending from the flat upper body through a hollow interior of the vessel to the elliptical lower body for movement of the lubricant fluid from a top to a bottom of the vessel.

In some embodiments, the system further comprises lower CV enabled cameras positioned adjacent the treadmill motion surface to capture foot movements of a user.

In some embodiments, the system further comprises an automatically deployable telescoping seat that is extendable into and retractable from an area over the IDTP.

Another aspect of this disclosure is a treadmill motion surface. The treadmill motion surface comprises an inner layer formed from an elastic material; an intermediate layer formed from patches having inelastic compression properties that increase a modulus of elasticity and decrease elongation of the elastic material; and an outer layer formed from the elastic material and having embedded materials that increase a coefficient of friction at an exterior surface of the treadmill motion surface.

These and other aspects and advantages of the SIMCAST system of this disclosure will be apparent from the following detailed description.

BRIEF DESCRIPTION OF THE DRAWINGS

Embodiments of this disclosure are described below with reference to the accompanying drawings, the following description, and the appended claims. The drawings illustrate selected embodiments, and not all possible implementations, and do not limit the scope of this disclosure.

DETAILED DESCRIPTION

This disclosure is drawn to a smart individual motion capture and spatial translation (SIMCAST) system 100. SIMCAST system 100 includes a motion translation platform that may also be referred to as a smart 360-degree treadmill. SIMCAST system 100 uses computer vision (CV) enabled cameras and machine learning to recognize the direction and velocity of foot movement of a user who is walking or otherwise moving on the motion translation platform. SIMCAST also uses natural language processing (NLP) to recognize certain voice commands such as "SIMCAST stop!" to immediately cease movement of the treadmill surface. CV enabled cameras may also recognize hand motions and translate physical motion to digital signals.

Figure 1:
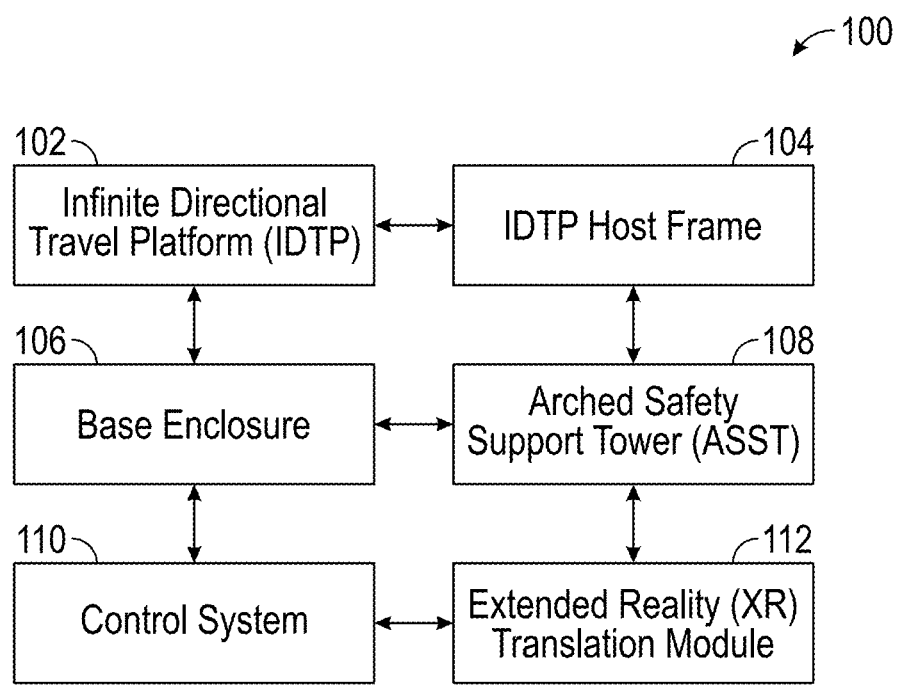
FIG. 1 is a block diagram of a smart individual motion capture and spatial translation (SIMCAST) system, according to this disclosure.

FIG. 1 is a block diagram of SIMCAST system 100, according to this disclosure. SIMCAST system 100 includes infinite directional travel platform (IDTP) 102; IDTP host frame 104; base enclosure 106; arched safety support tower (ASST) 108; control system 110; and extended reality (XR) translation module 112. Each of these components of SIMCAST system 100 is described in detail below.

Figure 2:
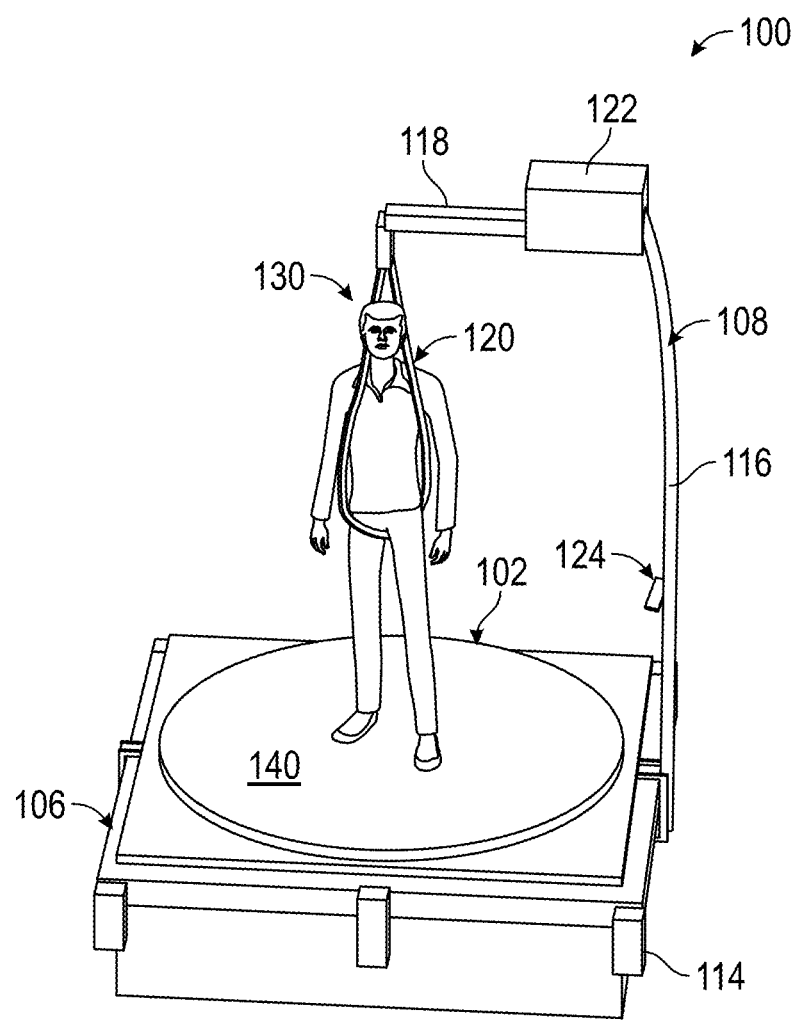
FIG. 2 is a conceptual perspective view of the SIMCAST system, according to this disclosure.

FIG. 2 is a conceptual perspective view of one embodiment of SIMCAST system 100, according to this disclosure. IDTP 102 is enclosed in and contained by base enclosure 106. The top surface of IDTP 102 defines a treadmill motion surface 140 on which user 130 may walk, run, jump, or otherwise move. IDTP host frame 104 is enclosed by base enclosure 106. Base enclosure 106 also provides extending outriggers 114 for stabilization of SIMCAST system 100 as well as additional lock positions for arched safety support tower (ASST) 108. ASST 108 includes vertical support arm 116, which may have an adjustable height, extending up from base enclosure 106 and over the head of user 130.

ASST 108 further includes horizontal support arm 118, which supports fall arrest system 120, and fall arrest system motor 122. Fall arrest system 120 includes a safety harness and an automatic tightening cable/belt system to secure user 130 while walking, running, jumping, or otherwise moving on treadmill motion surface 140. In some embodiments, fall arrest system motor 122 detects whether user 130 is properly secured based on the resistance of an auto-tightening system and can lock out any movement of treadmill motion surface 140 if user 130 falls suddenly. Horizontal support arm 118 may also serve as a cabling system feedway between fall arrest system 120 and motor 122.

SIMCAST system 100 further includes computer vision (CV) enabled cameras for capturing movement of user 130. An upper CV enabled camera 124 (as shown for example in FIG. 2) may be mounted on ASST 108 for capturing movement of the user's body, arms, and hands. For instance, CV enabled camera 124 may recognize and translate hand and body motions into digital signals. In addition, lower CV enabled cameras (i.e., with reference to FIGS. 11-12, x-axis CV camera 282 and y-axis CV camera 284) may be positioned adjacent treadmill motion surface 140 for capturing the direction and velocity of foot movement of a user who is walking or otherwise moving on the motion translation platform. The lower CV enabled cameras are illustrated in the embodiments of FIGS. 11-13D and may also be incorporated into the embodiment of FIG. 2. As illustrated in FIGS. 11-13D, SIMCAST system 100 may further include a control pad, microphone and handrail mounted on ASST 108, as well as a telescoping seat mounted to base enclosure 106.

Figure 3A:
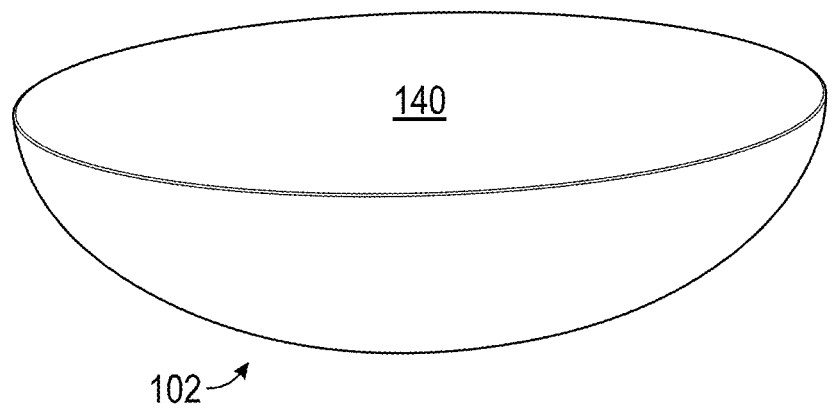
FIG. 3A is a conceptual perspective view of an infinite directional travel platform (IDTP) of the SIMCAST system, according to this disclosure.
Figure 3B:
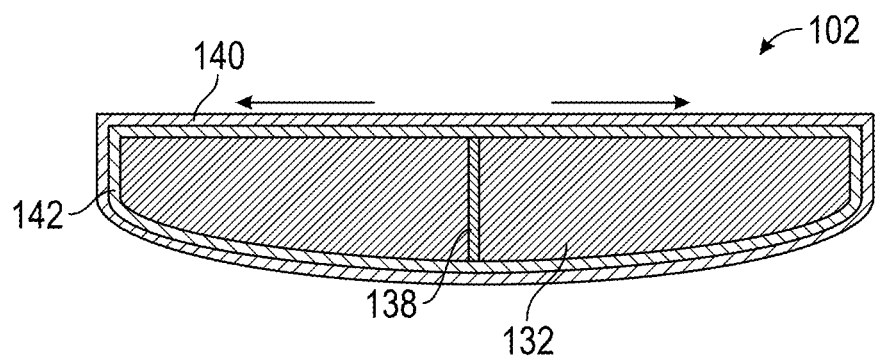
FIG. 3B is a sectional view of the IDTP, according to this disclosure.

FIGS. 3A-3G illustrate exemplary embodiments of infinite directional travel platform (IDTP) 102 of SIMCAST system 100, according to this disclosure. IDTP 102 includes a hollow metal or plastic ported vessel 132 as an inner core. FIGS. 4A-4B, 5A-5B, and 6A-6B show an example of IDTP ported vessel 132. In one non-limiting embodiment, IDTP ported vessel 132 comprises an elliptical lower body 134 and a flat upper body 136. A movable, flexible external surface layer, shown as treadmill motion surface 140 in FIGS. 3A-3B, is formed around IDTP ported vessel 132. In some embodiments, in order to facilitate movement of treadmill motion surface 140 around vessel 132, the transition between elliptical lower body 134 and flat upper surface 136 of vessel 132 is a curved, smooth surface, rather than an angled junction. Treadmill motion surface 140 encircles vessel 132 with an intervening lubricant fluid layer 142 therebetween as shown in FIG. 3. Treadmill motion surface 140 may comprise a polyurethane composite, rubber surface that can move in any direction and is externally applied around ported vessel 132.

Lubricant fluid layer 142 is trapped between treadmill motion surface 140 and IDTP ported vessel 132. In some embodiments, lubricant fluid layer 142 is a Newtonian lubricant fluid such as silicone oil (e.g., an inert silicone oil). A Newtonian fluid is a fluid in which viscous stresses arising from its flow are at every point linearly correlated to the local strain rate, which is the rate of change of its deformation over time. Stresses are proportional to the rate of change of the fluid's velocity vector.

Lubricant fluid layer 142 reduces friction between ported vessel 132 and treadmill motion surface 140 to nearly zero, allowing 360-degree movement of surface 140 in all directions relative to vessel 132. The polyurethane rubber construction of surface 140 allows it to handle the compressive and shear stresses of user movement and contact, as well as to stretch when needed with sufficient elasticity to bring it back to its original position. In some embodiments, IDTP ported vessel 132 is made from a metal such as steel or aluminum. Aluminum is advantageous in that it is a relatively lightweight material. In other embodiments, vessel 132 may be made from other materials such as plastic or fiberglass.

In some embodiments, treadmill motion surface 140 comprises multiple layers of polyurethane rubber or other material that are applied over IDTP ported vessel 132. Each layer may be formed, for example, by brush coating liquid polyurethane rubber over ported vessel 132. Once the layers are applied and cured, air may be blown between vessel 132 and surface 140 to separate vessel 132 from surface 140. In some implementations, one or more layers of a mesh-like or screen-like material may be applied between the brush-coated polyurethane layers in order to slightly decrease the flexibility of and increase the tension of surface 140 so that it can be pulled and pushed more easily around vessel 132 and lubricant fluid layer 142 and is not subject to issues such as bunching up. Once treadmill motion surface 140 is formed, lubricant fluid 142 is filled into the space between vessel 132 and surface 140. Treadmill motion surface 140 is then sealed to trap lubricant fluid layer 142 between vessel 132 and surface 140.

Figure 3C:
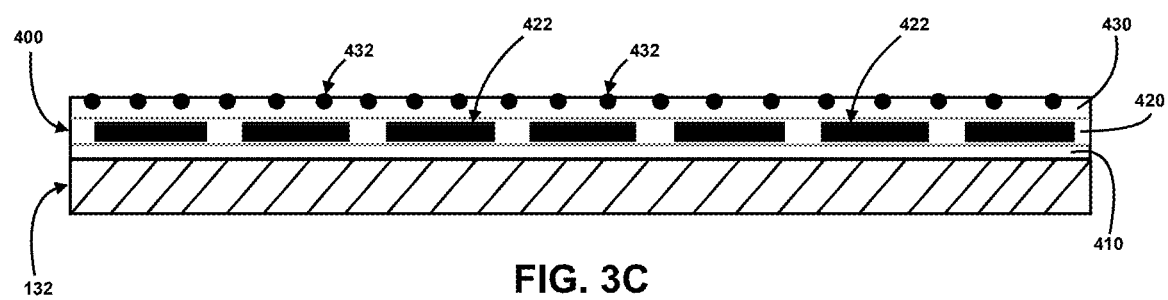
FIG. 3C is a conceptual cross-sectional view of a tensile-flex mesh-tread (TFMT) motion surface, according to this disclosure.

As described above, the treadmill motion surface may be a layered polyurethane rubber with mesh between layers. One example of such a treadmill motion surface, hereinafter referred to as a tensile-flex mesh-tread (TFMT) motion surface 400, is illustrated in FIGS. 3C-3G. FIG. 3C is a conceptual cross-sectional view of TFMT motion surface 400, as applied to IDTP ported vessel 132 before lubricant fluid 142 is filled in between TFMT motion surface 400 and IDTP ported vessel 132. As shown in FIG. 3C, TFMT motion surface 400 comprises inner layer 410, intermediate layer 420, and outer layer 430. Inner layer 400 is formed from an elastic material such as polyurethane, rubber, polyurethane rubber, or another suitable elastic material with properties that allow layer 410 to resume its normal shape spontaneously after contraction or distortion. In one example, inner layer 410 is first formed by brush coating a first layer of liquid polyurethane rubber (or other elastic material) over IDTP ported vessel 132. Intermediate layer 420 comprises perforated patches 422 with inelastic compression properties that increase the modulus of elasticity and decrease elongation of the elastic material per linear unit along structural lines of TFMT motion surface 400. Patches 422 are positioned as described below on the first layer of polyurethane rubber to define intermediate layer 420. Outer layer 430 is formed from an elastic material such as polyurethane, rubber, polyurethane rubber, or another suitable elastic material that encapsulates friction-increasing granules 432 to increase the coefficient of friction at outer layer 430, thereby helping to reduce user slips and increasing the grip of motorized wheels 152 that turn TFMT motion surface 400.

Polyurethane rubber and other elastic materials may elongate by 400%-1000% under maximal tensile forces. Such elasticity is helpful in allowing TFMT motion surface 400 to freely deform as it surrounds and orbits IDTP ported vessel 132 during use of SIMCAST system 100. However, the elastic deformation (elongation) may be excessive and may result in the polyurethane rubber or other elastic material stretching excessively instead of pulling itself around vessel 132. To address this issue, a strong and flexible intermediate layer 420 comprising patches 422 is provided. Patches 422 have flexible surfaces but inelastic compression properties. Patches 422 and their placement provide control over the deformation and elasticity of TFMT motion surface 400.

Figure 3D:
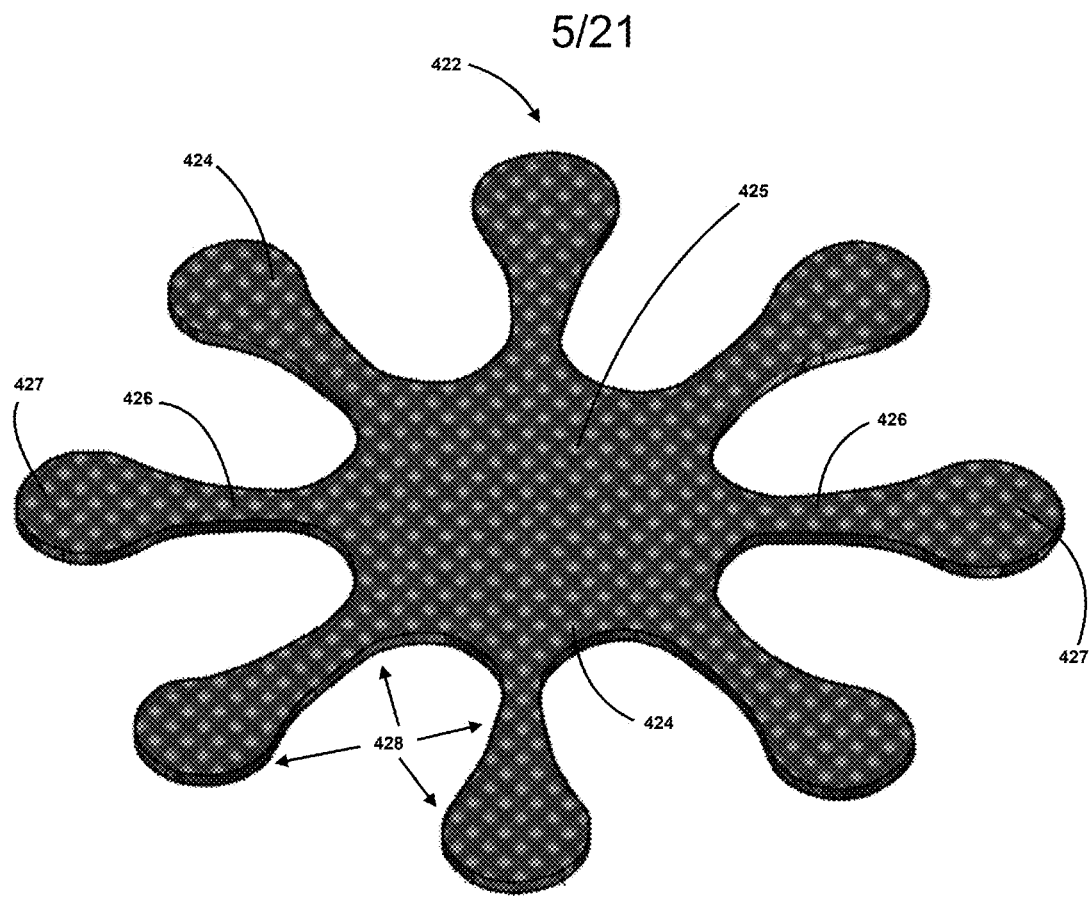
FIG. 3D is a perspective view of a patch having a flexible surface and inelastic compression properties, according to this disclosure.
Figure 3E:
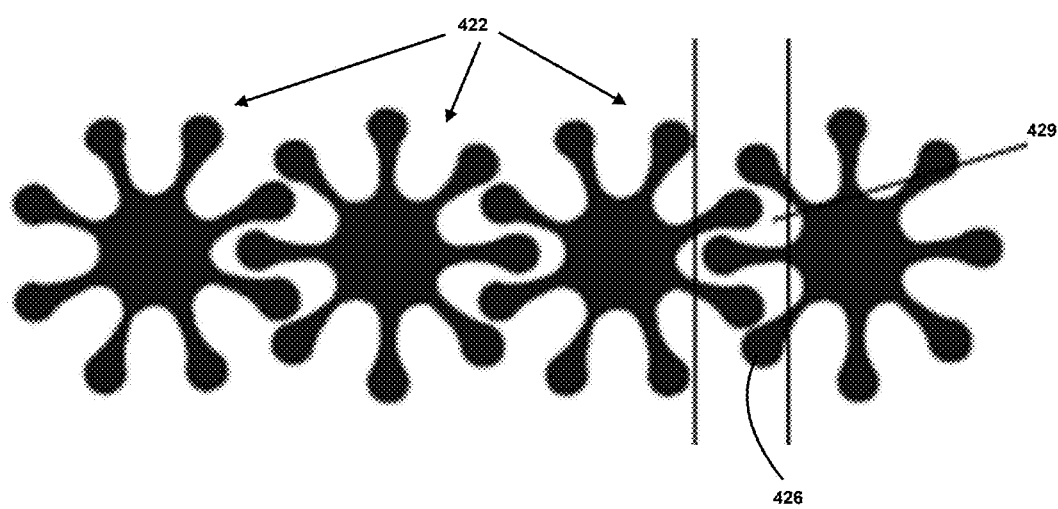
FIG. 3E is a top view of multiple patches arranged in an interlocking configuration, according to this disclosure.

Patches 422 are illustrated in more detail in FIGS. 3D-3E. In one example, patches 422 comprise a vinyl coated polyester mesh formed with surface perforations 424 to maintain adhesion to the adjacent inner and outer layers 410 and 430. Perforations 424 are needed as a non-perforated material may create pockets where inner layer 410 and/or outer layer 430 have no layer-to-layer adhesion at the location of the patch placements, which could lead to layer separation or delamination of TFMT motion surface 400 during use of SIMCAST system 100. Patches 422 are shaped to provide maximum flexibility of the patch surface so that the polyurethane rubber (or other elastic material) does not bunch up as TFMT motion surface 400 travels around IDTP ported vessel 132, especially around top edge 133 (see FIGS. 3F-3G). In one example, each patch 422 comprises a plurality of fingers 426 projecting in radial symmetry from a circular central area 425. Fingers 426 may be formed with bulbous ends 427 to improve their anchorage in the surrounding polyurethane rubber material.

The shape of patches 422, in particular, the plurality of fingers 426 radially projecting from central area 425, provides a substantial amount of outer edge space 428. In one example, depicted in FIG. 3E, patches 422 are arranged in intermediate layer 420 such that fingers 426 interlock with each other. The edge space 429 where the edges 428 of fingers 426 interact and interlock is optimized by the length of fingers 426. Tensile forces that arise between patch edges 428 can be better managed by maximizing the interacting length of edges 428. The additional patch edge length between patches 422 within a given linear inch of surface results in additional polyurethane rubber material between each patch 422, thereby preserving general elasticity while increasing the modulus of elasticity from patch to patch when a given patch 422 is placed under tensile stress. The increase in the modulus elasticity in any given direction is directly proportional to the number of patches 422 placed within a given linear distance in TFMT motion surface 400.

Figure 3F:
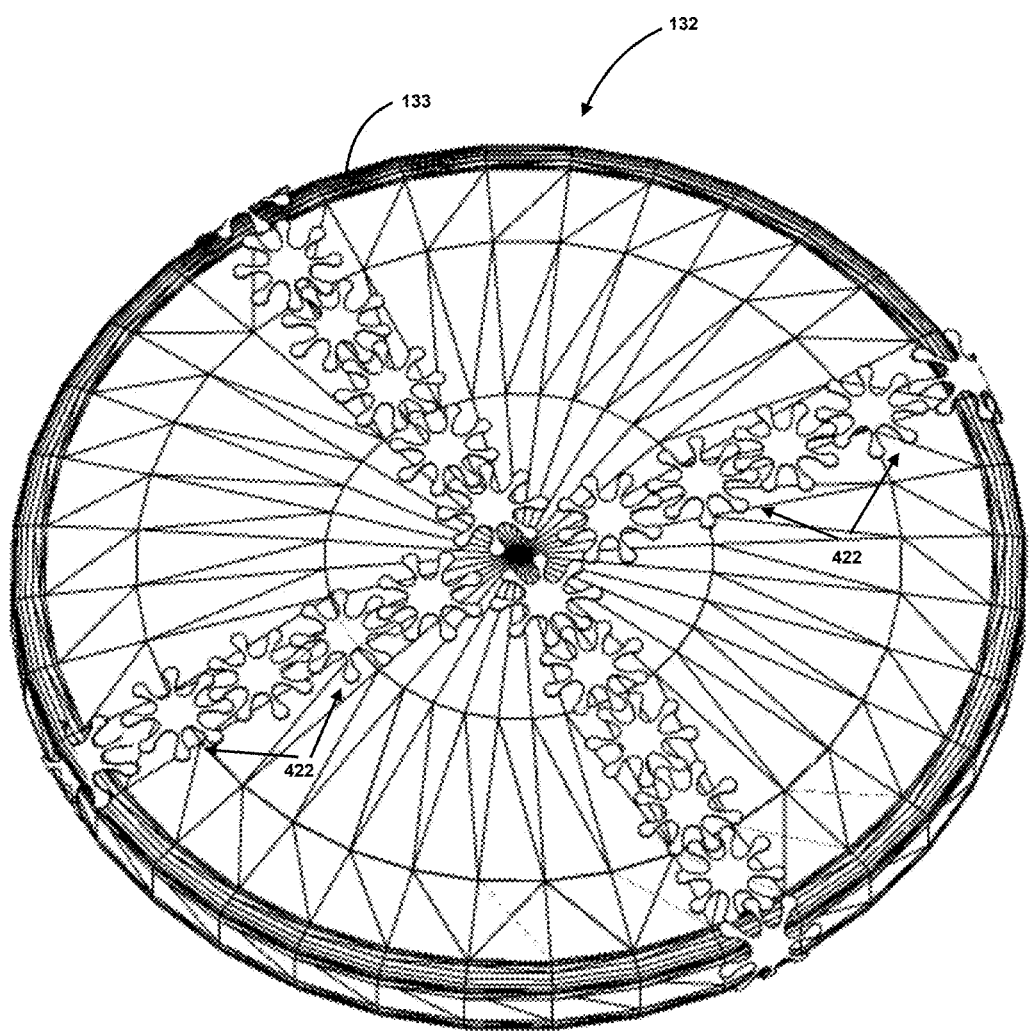
FIG. 3F is a perspective view showing the configuration of intermediate layer patches relative to an IDTP ported vessel, according to this disclosure.
Figure 3G:
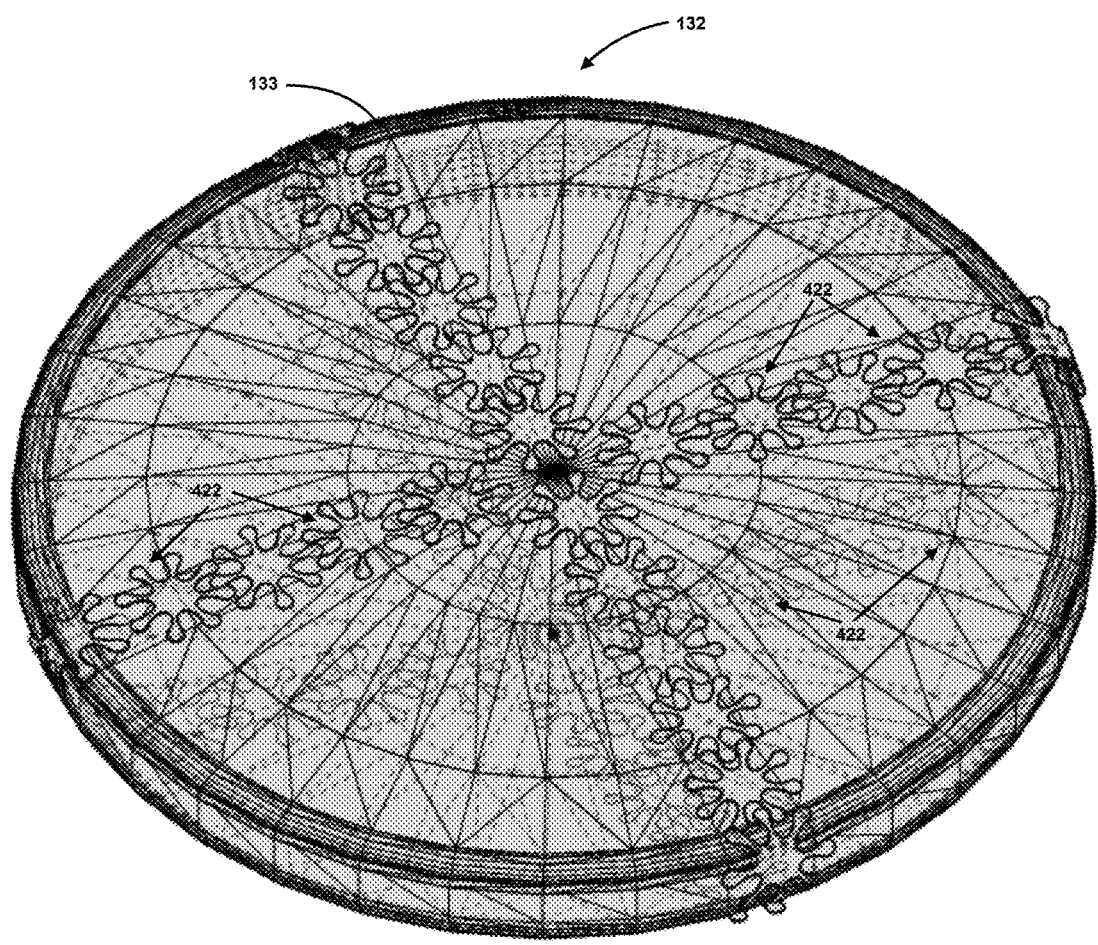
FIG. 3G is a transparent perspective view showing the configuration of intermediate layer patches relative to the IDTP ported vessel, according to this disclosure.
Figure 4A:
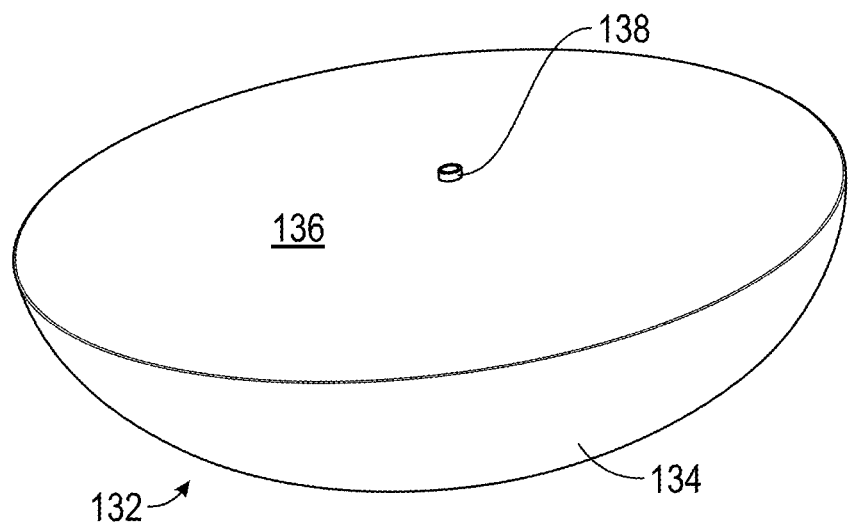
FIG. 4A is a perspective view of a ported vessel of the IDTP, according to this disclosure.
Figure 4B:
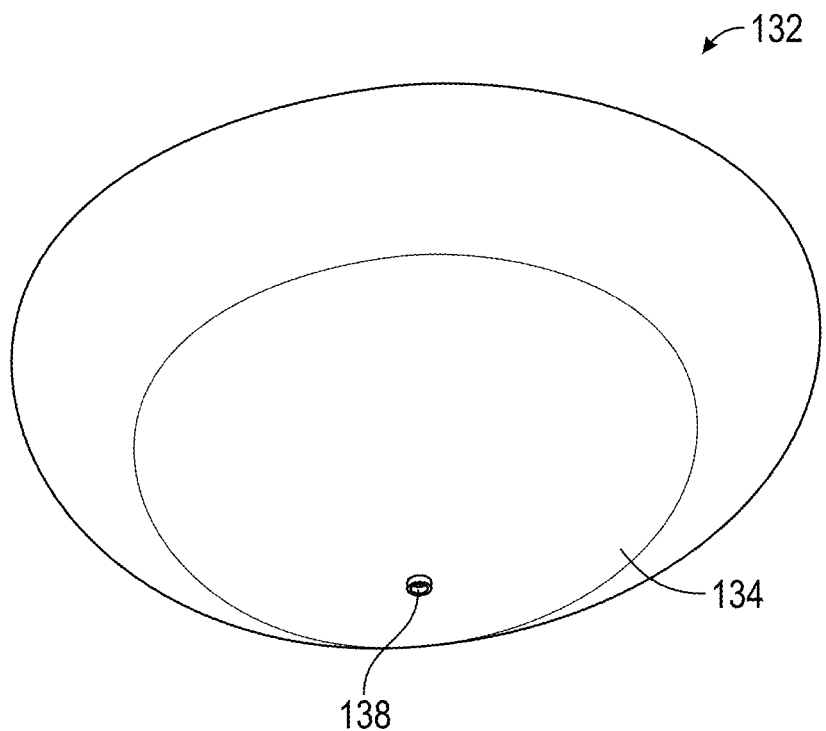
FIG. 4B is a bottom view of the IDTP ported vessel, according to this disclosure.
Figure 5A:
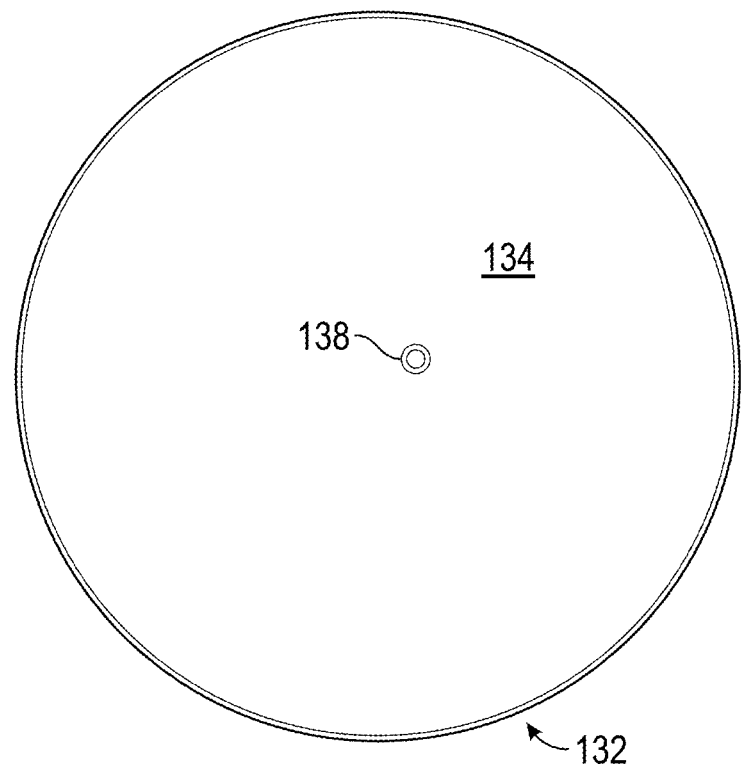
FIG. 5A is a bottom view of the IDTP ported vessel, according to this disclosure.
Figure 5B:
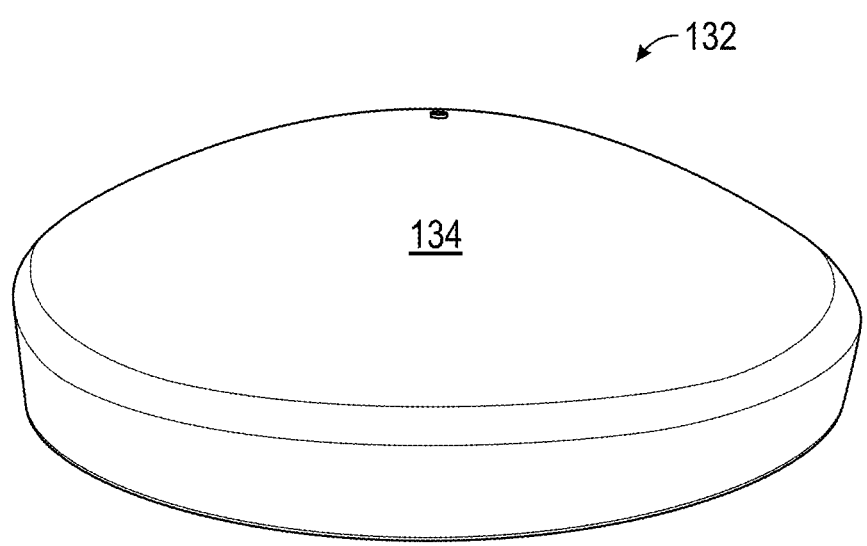
FIG. 5B is a side view of the IDTP ported vessel, with its flat upper surface facing downwards, according to this disclosure.
Figure 6A:
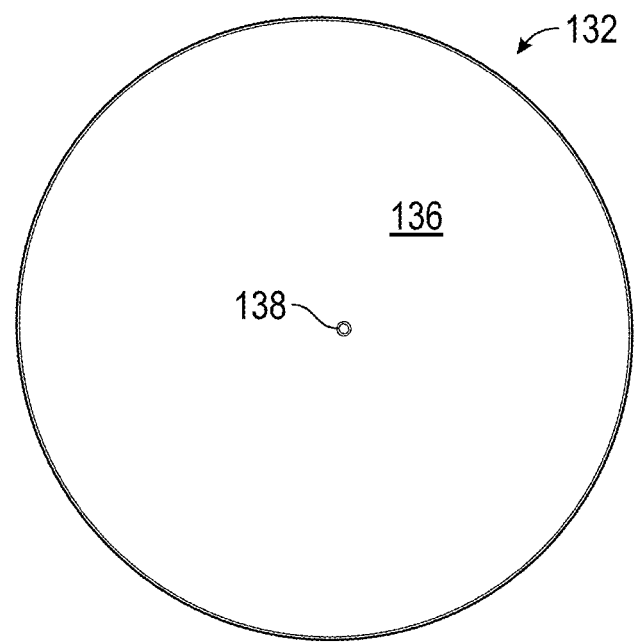
FIG. 6A is a top view of the IDTP ported vessel, according to this disclosure.
Figure 6B:
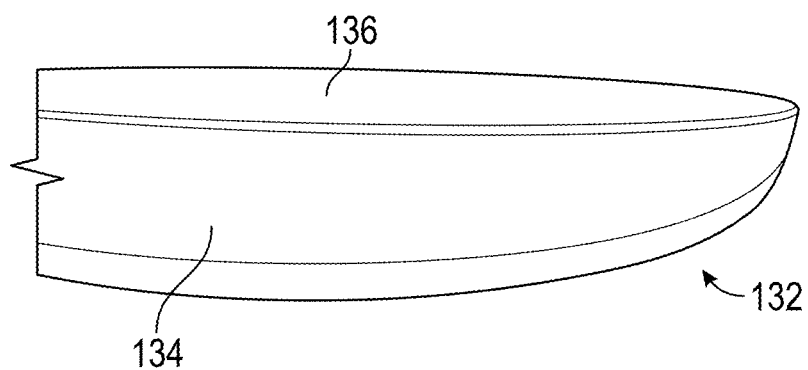
FIG. 6B is a side view of the IDTP ported vessel, with its flat upper surface facing upwards, according to this disclosure.

One exemplary arrangement of patches 422 of intermediate layer 420 around IDTP ported vessel 132 is illustrated in FIGS. 3F-3G. In particular, patches 422 are arranged linearly and interlockingly across flat upper body 136 of vessel 132 and around the vertical arcs of elliptical lower body 134 (see transparent view of FIG. 3G). Positioning patches 422 in this manner increases the modulus of elasticity along critical linear positions in the completed TFMT motion surface 400. Due to the shape of vessel 132, the vertical arcs of elliptical lower body 134 are shorter than the largest horizontal circle (the circumference of flat upper body 136) and, therefore, serve as appropriate placement locations during surface manufacturing for increasing the modulus of elasticity and decreasing the elongation with respect to the tensile forces arising from both user ambulation and the motor driven wheels 152 (FIG. 7) that move TFMT motion surface 400.

Outer layer 430 of TFMT motion surface 400 comprises an elastic material with embedded materials that increase the coefficient of friction at the exterior surface of TFMT motion surface 400. Outer layer 430 may be formed, for example, by brush coating over intermediate layer 420 of patches 422 and inner layer 410. For example, outer layer 430 may be formed from a polyurethane rubber coating that encapsulates ethylene propylene diene monomer (EPDM) granules or styrene-butadiene rubber (SBR) granules. Embedding EPDM or SBR granules, or other durable surface friction increasing materials in the outer layer 430 increases the coefficient of friction at the external surface of TFMT motion surface 400, which helps to reduce slips by the user and increases the grip of motorized wheels 152 that move TFMT motion surface 400.

In some embodiments, as shown in FIGS. 3-6, IDTP vessel 132 includes port or stem 138 that is welded inside vessel 132 to define a central channel or path for movement of lubricant fluid 142 from top to bottom of vessel 132. In addition, the channel defined by port 138 may assist in mounting vessel 132 to a base or support during application of the polyurethane coating layers that define treadmill motion surface 140 (or TFMT motion surface 400). Once treadmill motion surface 140/400 is fully formed, the base or support is removed from port 138, leaving a small hole or aperture in surface 140/400 through which lubricant fluid 142 may be filled into the space between vessel 132 and surface 140/400. The hole or aperture in treadmill motion surface 140/400 is then sealed to trap lubricant fluid 142 between vessel 132 and surface 140/400.

The minimum diameter of treadmill motion surface 140/400 may be limited by the walking stride length of user 130, which for adults averages about 30 inches. The maximum diameter of treadmill motion surface 140/400 is about 52 inches, due to limits on the tension and elasticity ratio of surface 140/400. Treadmill motion surface 140/400 (which may be made of polyurethane rubber) may be stretchy enough to turn the corners of upper surface 136 of vessel 132 and to retract when under less tension. As described above with reference to TFMT motion surface 400, treadmill motion surface 140 may be a composite made with an embedded mesh or patches 422 to increase the tensile strength of surface 140.

Figure 7:
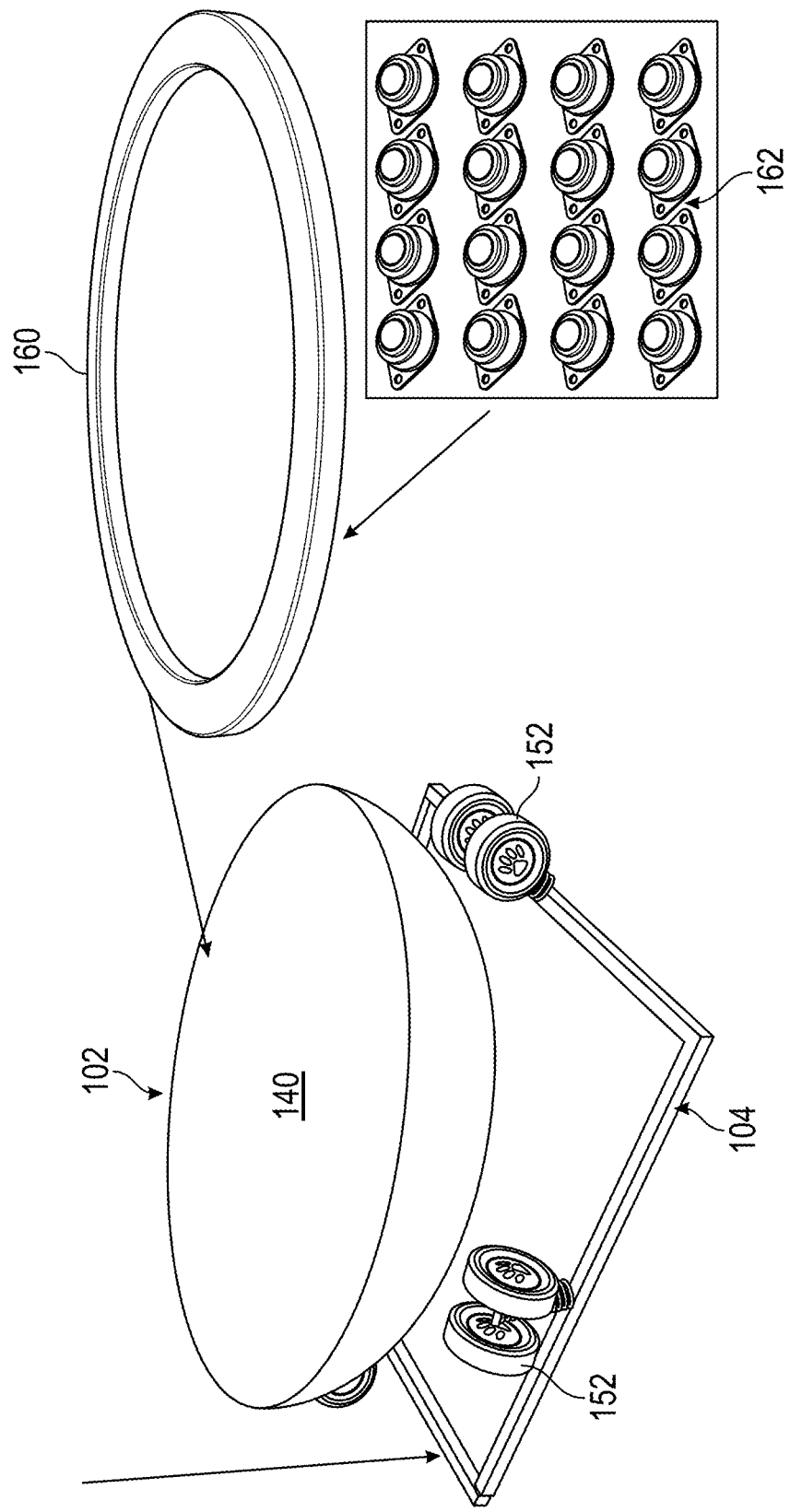
FIG. 7 is a conceptual perspective view of the IDTP, an IDTP host frame, and an IDTP retention ring, according to this disclosure.
Figure 8A:
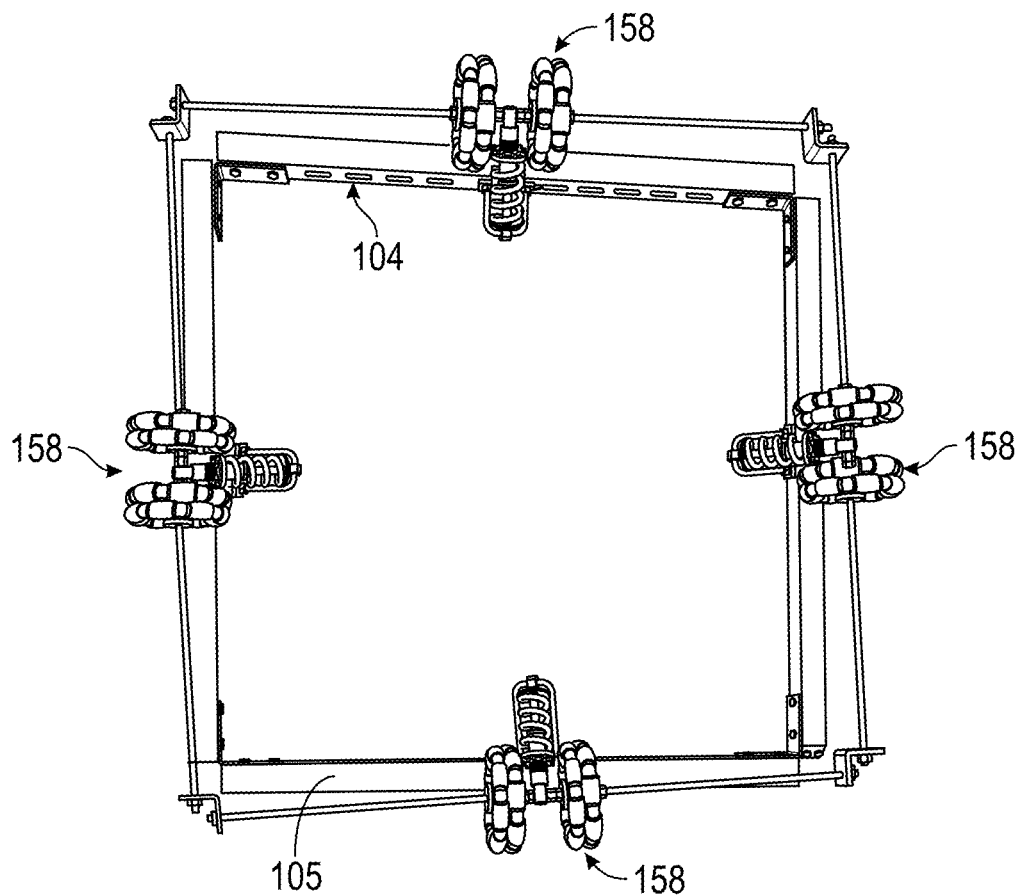
FIG. 8A is a bottom view of the IDTP host frame with casters attached, according to this disclosure.
Figure 8B:
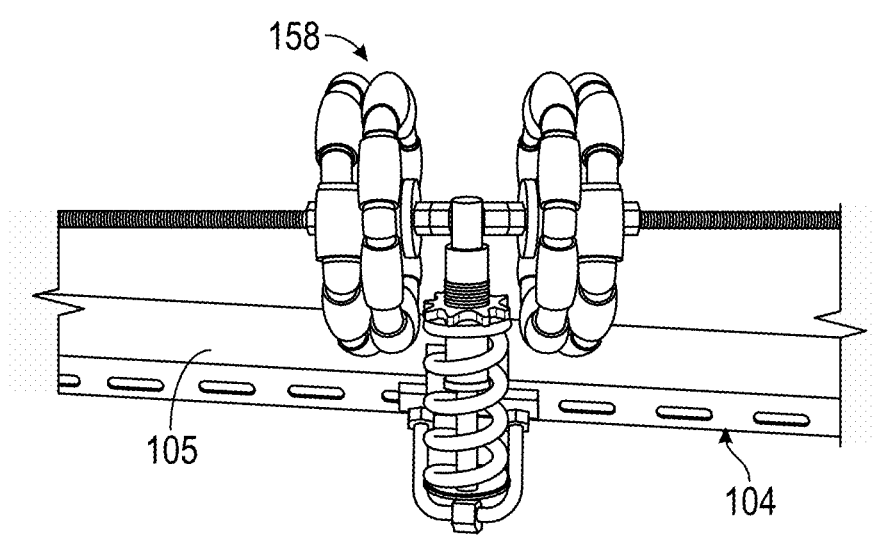
FIG. 8B is a perspective view of a caster of the IDTP host frame, according to this disclosure.
Figure 9:
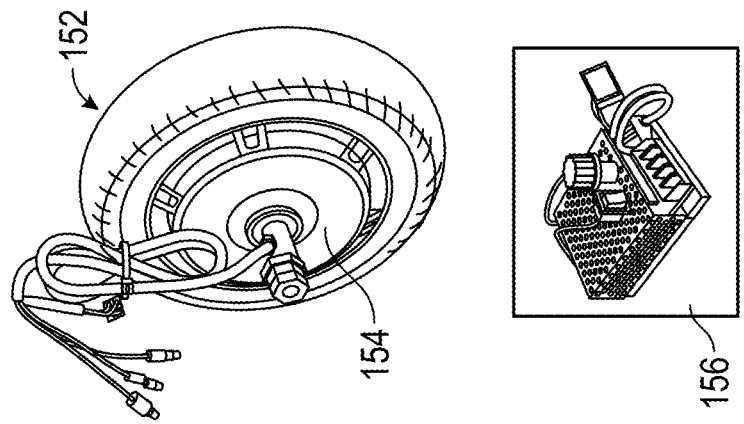
FIG. 9 is a bottom view of the IDTP host frame with wheels incorporating hub motors attached to the casters, according to this disclosure.
Figure 9:
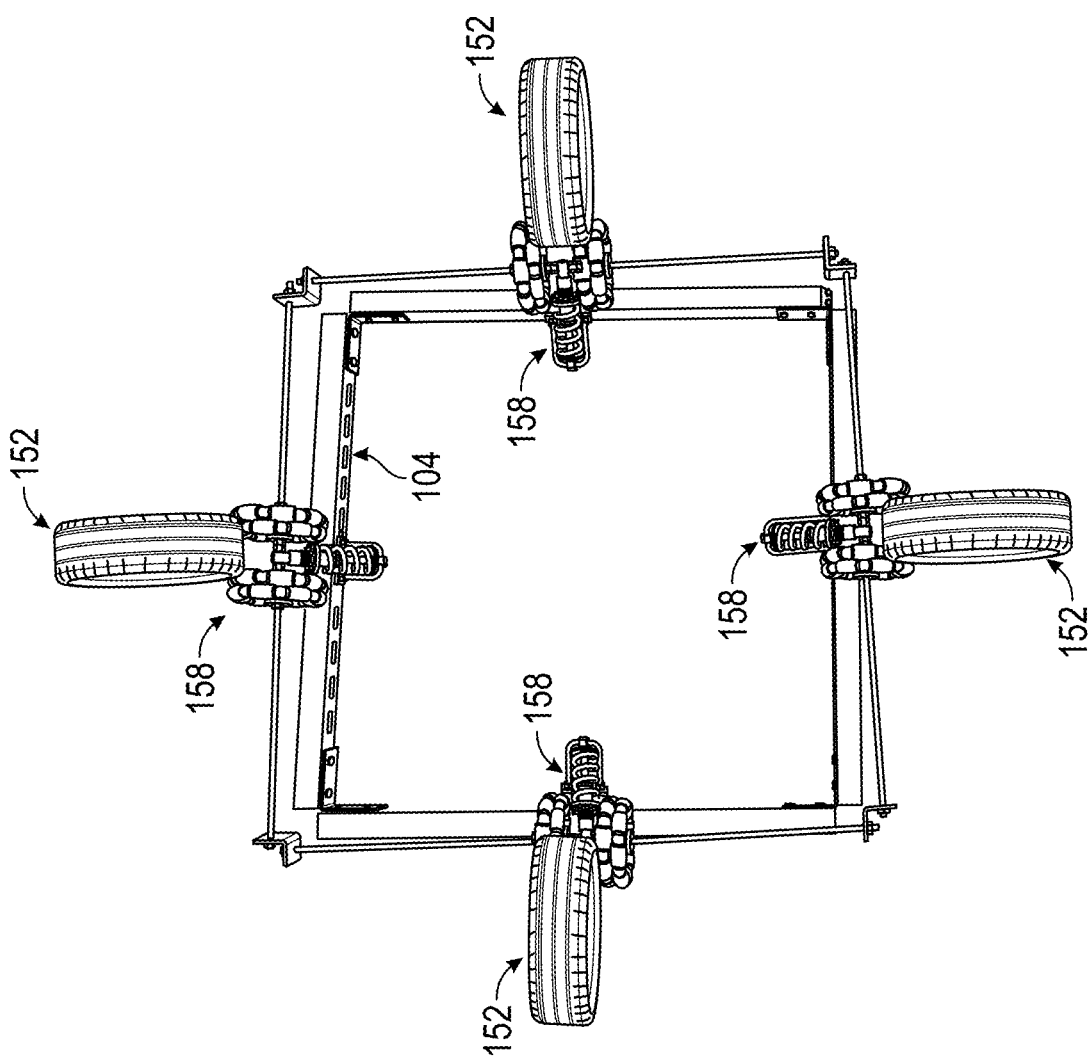

In some embodiments, as shown in FIGS. 7-9, IDTP host frame 104 has a rigid structure that supports and positions shock-absorbing struts. The struts host smart 360-degree multidirectional wheels 152 that form a cradle that supports and elevates IDTP 102 and provides freedom of motion to treadmill motion surface 140/400. Alternatively, and as described in more detail below with reference to FIGS. 11-12, IDTP host frame 104 may incorporate a concave shaped vessel cradle with a rigid structure that supports and positions IDTP 102. The IDTP vessel cradle may be studded with ball transfer bearings to provide support to the IDTP without restricting IDTP surface movement.

IDTP host frame 104 also anchors a plurality of motors that motivate multidirectional wheels 152 to move treadmill motion surface 140/400 in directions and speeds induced by motor controllers 156. In some embodiments, as shown in FIG. 9, wheels 152 include hub motors 154 that are controllable with motor controllers 156. FIGS. 8A-8B show that there may be four casters 158 arranged in a perpendicular manner to each other on host frame 104. There may be one caster 158 positioned on each member 105 of rectangular host frame 104. A multidirectional wheel 152 is coupled to each caster 158 on host frame 104 to allow for smoother movement and reduced friction for wheels 152.

As illustrated in FIG. 7, IDTP retention ring 160 is a rigid ring that is studded with a plurality of transfer bearings 162. In some embodiments, IDTP retention ring 160 is made of steel. IDTP retention ring 160 holds IDTP 102 in place, preventing IDTP 102 from tipping or moving vertically but allowing treadmill motion surface 140/400 to move freely in a horizontal plane via transfer bearings 162. Base enclosure 106 includes and fastens IDTP retention ring 160.

In some embodiments, IDTP 102 may include one or more control systems 110. Control system 110 processes images provided by computer vision (CV) enabled cameras 124 mounted on ASST 108 and additional CV enabled cameras positioned adjacent to treadmill motion surface 140/400. Control system 110 may also receive and process audio data from a microphone to control certain functions of operation. For instance, control system 110 may use natural language processing (NLP) to recognize certain voice commands such as "SIMCAST stop!" to immediately cease movement of the treadmill motion surface 140/400. Control system 110 comprises processing module(s) or unit(s) that use digital images, videos, audio and other data inputs combined with advanced computer vision (CV), machine learning, and natural language processing (NLP) to recognize directional commands, path of movement and estimated velocity of movement within spatial axes, and to calculate the anticipated path of travel. After calculating the anticipated path of travel, control system 110 sends commands to motor controllers 156 to cause hub motors 154 to respond with appropriate speeds and rotational adjustments so that treadmill motion surface 140/400 rotates in anticipation of the forthcoming footfall of user 130. CV enabled cameras positioned adjacent to treadmill motion surface 140/400 monitor movement of the feet of user 130. In addition, CV enabled camera(s) 124 mounted on ASST 108 monitor movement of the hands, arms, and body of user 130.

SIMCAST system 100 also includes extended reality (XR) translation module 112. XR translation module 112 is a processing and communication module that translates digital data regarding physical characteristics and physical motion of user 130 and the user's appendages to an XR or video gaming platform for design of a like-size avatar that may be displayed and animated within the XR or video gaming platform. Accordingly, an avatar may be associated with user 130 in various applications and use of SIMCAST system 100.

In some embodiments, fall arrest system 120 includes a fully adjustable harness and retractable cable and strap system using a "fall arrest" approach where user 130 may move freely, but if user 130 suddenly falls, fall arrest system 120 stops the fall. In one example, fall arrest system 120 holds user 130 and any of motors 154 that are turning treadmill motion surface 140/400 are locked out until fall arrest system 120 engages with at least ten pounds of resistance (meaning that the harness of system 120 is snug to the body of user 130). Motors 154 also lock out if the fall arrest feature is deployed.

Figure 10:
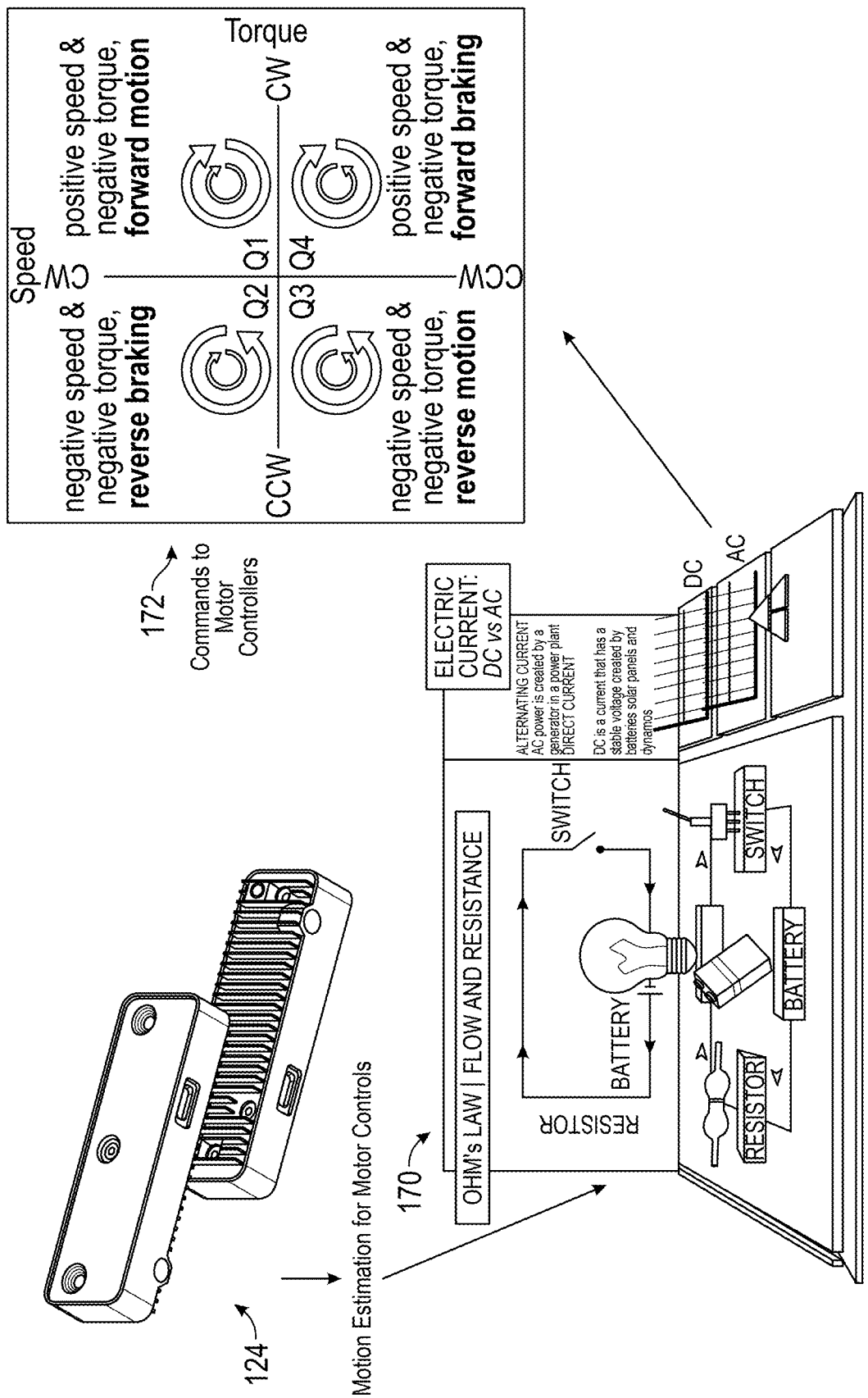
FIG. 10 is a pictorial illustration of computer vision (CV) enabled cameras and an exemplary control system, according to this disclosure.

When ready to engage with treadmill motion surface 140/400, user 130 may activate CV enabled vision cameras 124, and if safely engaged, motors 154 will be in a ready state. User 130, safely harnessed in fall arrest system 120, may begin to take a step forward or backwards on treadmill motion surface 140/400. With reference to FIG. 10, CV enabled cameras mounted adjacent to motion surface 140/400 and/or on ASST 108 capture the direction, speed, and acceleration of the user's foot movements and use CV algorithms to predict and estimate the direction and velocity of the user's path of travel (motion estimation). Signals from the CV enabled cameras are translated in real time by motor control unit (MCU) 170 (which may be incorporated in or a component of control system 110), which sends commands 172 to engage motor controllers 156 to move treadmill motion surface 140/400 in accordance with the predicted path of travel of the user. There may also be a plurality of video cameras and/or laser scanning devices placed on ASST 108.

In some embodiments, hub motors 154 are engaged for non-linear movement with hub motors 154 on opposite sides of host frame 104 turning in opposite directions. Hub motors 154 connected to wheels 152 (FIG. 9) are configured to move treadmill motion surface 140/400. MCU 170 (control unit 100) is configured to send commands 172 to motor controllers 156 for controlling hub motors 154 on wheels 152. MCU 170 may also be configured to send directional movement signals to gaming, virtual reality, mixed reality, and augmented reality platforms.

As shown in FIG. 10, hub motors 154 may be DC motors that are able to move over four quadrants, meaning that IDTP 102 operates in four quadrants. The four quadrants include forward motoring (Q1), reverse braking (Q2), reverse motoring (Q3), and forward braking (Q4). Thus, hub motors 154 operate in two modes, motoring and braking, which in turn operate in forward and reverse modes. Motors of this type that are capable of operating in both directions of rotation and of both motoring and regeneration are sometimes referred to as four quadrant variable speed drives. In motoring mode, hub motors 154 convert electrical energy into mechanical energy, supporting motion of wheels 152. In braking mode, hub motors 154 work as generators and convert mechanical energy into electrical energy, opposing motion of wheels 152. Hub motors 154 can work in both forward and reverse directions, i.e., in motoring and braking operations.

The power generated by motors 154 is the product of angular speed and torque. For multi-quadrant operation of motors 154, the following conventions about the signs of torque and speed are used. When motors 154 are rotated in the forward direction, the speed of motors 154 is considered positive. When motors 154 are rotated in the reverse direction, the speed of motors 154 is considered negative. The rate of change of speed positively in the forward direction, or the torque that provides acceleration, is known as positive motor torque. In the case of retardation, the motor torque is considered negative. Load torque is opposite to the positive motor torque in this direction. As a result of forward and reverse motion of treadmill motion surface 140/400 imparted by motors 154, user 130 is able to move in forward and reverse directions. Further, motors 154 brake to stop motion of surface 140/400 when user 130 stops so that user 130 does not fall.

Figure 11:
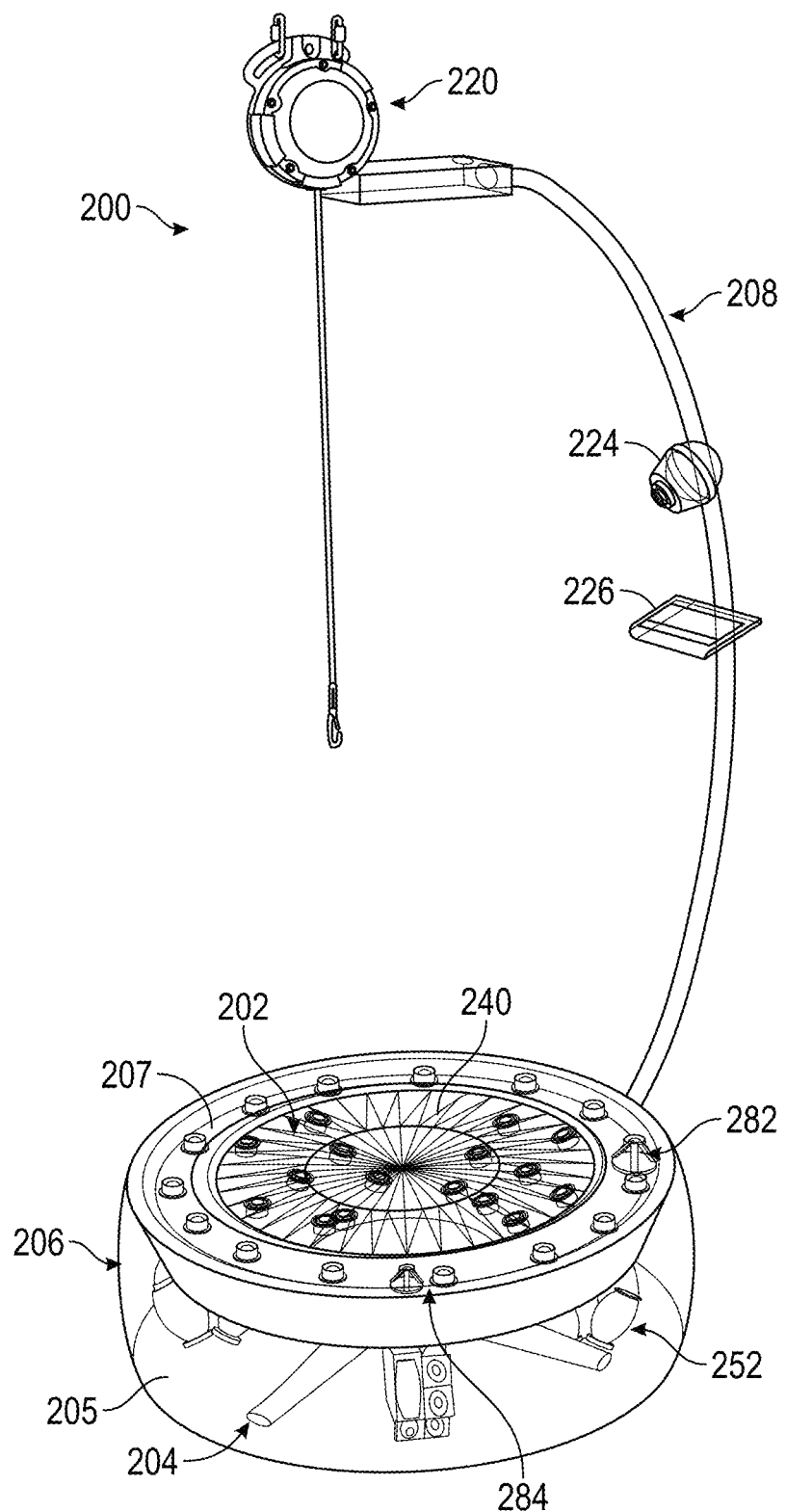
FIG. 11 is a perspective view of an alternative embodiment of a SIMCAST system, according to this disclosure.
Figure 12:
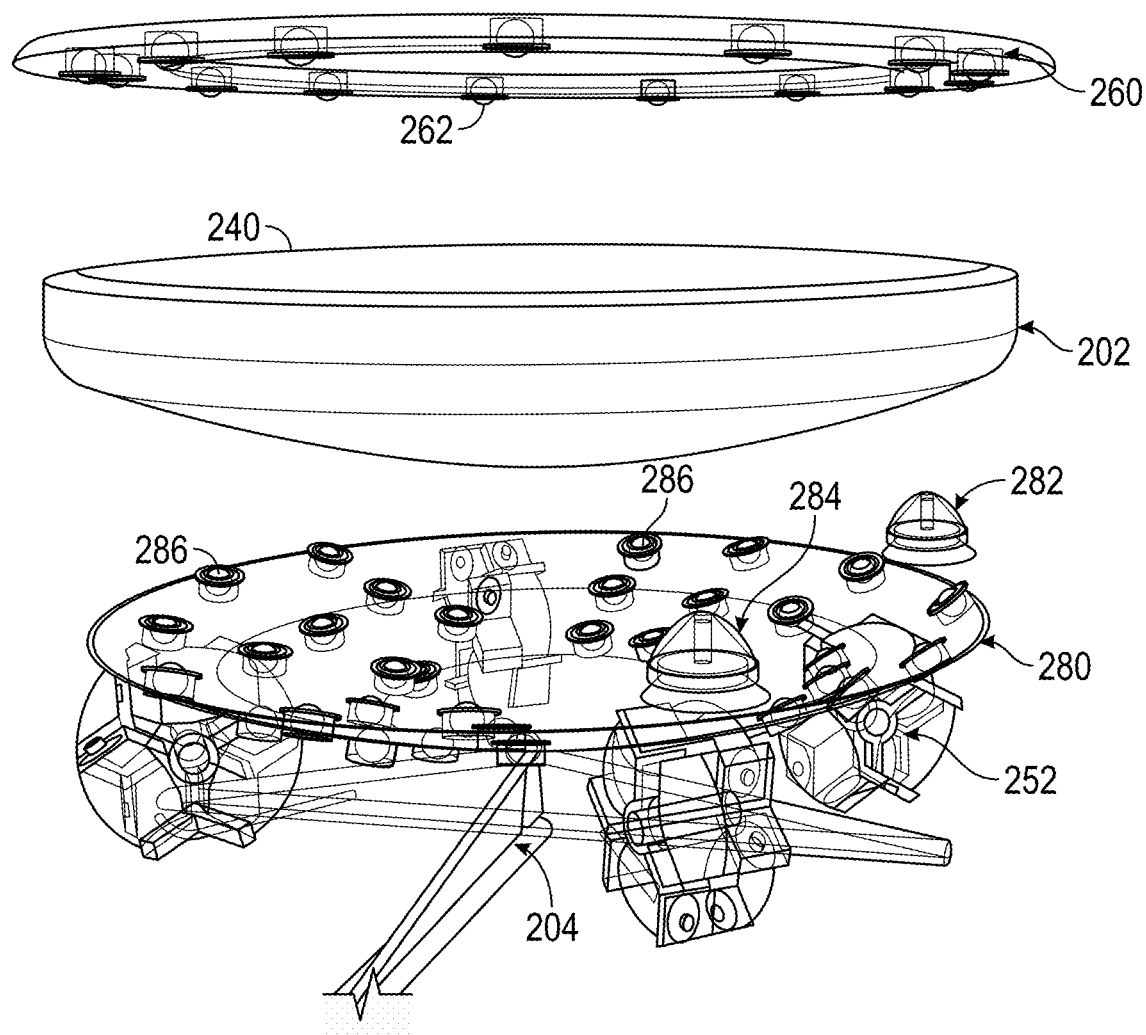
FIG. 12 is a disassembled view of the IDTP retention ring, IDTP ported vessel, and IDTP vessel cradle of the SIMCAST system of FIG. 11, according to this disclosure.

Another embodiment 200 of a SIMCAST system is illustrated in FIGS. 11-12. SIMCAST system 200 includes infinite directional travel platform (IDTP) 202 which, like IDTP 102 of system 100, includes a ported vessel surrounded by a treadmill motion surface 240 with an intervening lubricant layer that allows for smooth, infinite movement of surface 240 in any direction. In the description of embodiment 200 that follows, treadmill motion surface 240 may also be implemented as TFMT motion surface 400 as described with reference to FIGS. 3C-3G. As illustrated in FIG. 12, IDTP host frame 204 is a rigid structure with a concave shaped vessel cradle 280 that supports and positions IDTP 202. IDTP vessel cradle 280 is studded with ball transfer bearings 286 to provide support to IDTP 202 without restricting movement of treadmill motion surface 240. Ball transfer bearings 286 allow for smooth and unrestricted movement of treadmill motion surface 240 in any direction.

IDTP host frame 204 anchors wheels 252 that have roller treads that allow multidirectional rotation. Electric hub motors contained within wheels 252 compel movement of wheels 252 with a single axis to move treadmill motion surface 240 in directions and speeds induced by the motor controllers.

IDTP retention ring 260 is also studded with a plurality of ball transfer bearings 262. IDTP retention ring 260 secures IDTP 202 in place vertically, preventing IDTP 202 from tipping or moving vertically but allowing treadmill motion surface 240 to glide freely in a horizontal plane via transfer bearings 262. In essence, retention ring 260 and ball transfer bearings 262 enable fluid motion of treadmill motion surface 240 in any horizontal direction while ensuring stability of IDTP 202. The assembly of IDTP 202, host frame 204, vessel cradle 280, and retention ring 260 is enclosed by base enclosure 206, which includes top cover 207 and exterior shroud 205. The top of IDTP 202 is left exposed to form treadmill motion surface 240 on which a user can walk, run, jump, or move in any other manner.

X-axis CV camera 282 and Y-axis CV camera 284 are positioned adjacent to treadmill motion surface 240 for capturing the direction and speed of the user's foot movements. This information is used to control the motion of treadmill surface 240 in real-time to match the user's intended direction and speed, as discussed above with respect to system 100, thereby creating an immersive motion experience.

Like SIMCAST system 100, SIMCAST system 200 further comprises arched safety support tower (ASST) 208 that supports fall arrest system 220 for user safety. Upper computer vision (CV) camera 224 is also mounted on ASST 208 to capture body and appendage motion of the user. Thus, in addition to capturing user foot motion with X-axis CV camera 282 and Y-axis CV camera 284, motion of the user's body and appendages is also captured to enable a more accurate and immersive simulation of movement. Control pad 226 is also attached to ASST 208 to allow users to control various aspects of system 200 such as setting movement parameters of IDTP 202, controlling the CV cameras, and other operational aspects.

Another embodiment 300 of a SIMCAST system that includes a customizable telescoping seat is illustrated in FIGS. 13A-13D. SIMCAST system 300 is similar in most respects to system 200, including an IDTP 302 defining a treadmill motion surface 340; host frame 304 supporting concave shaped vessel cradle 380 studded with ball transfer bearings 386 to allow for smooth and unrestricted movement of treadmill motion surface 340 in any direction; wheels 352 anchored by host frame 304 and driven by hub motors; lower x-axis and y-axis CV cameras 382 and 384; base enclosure 308; and ASST 308 supporting fall arrest system 320, upper CV camera 324, and control pad 326. Control pad 326 also includes a microphone for accepting voice commands, as described below. In the description of embodiment 300 that follows, treadmill motion surface 340 may also be implemented as TEMT motion surface 400 as described with reference to FIGS. 3C-3G.

Figure 13A:
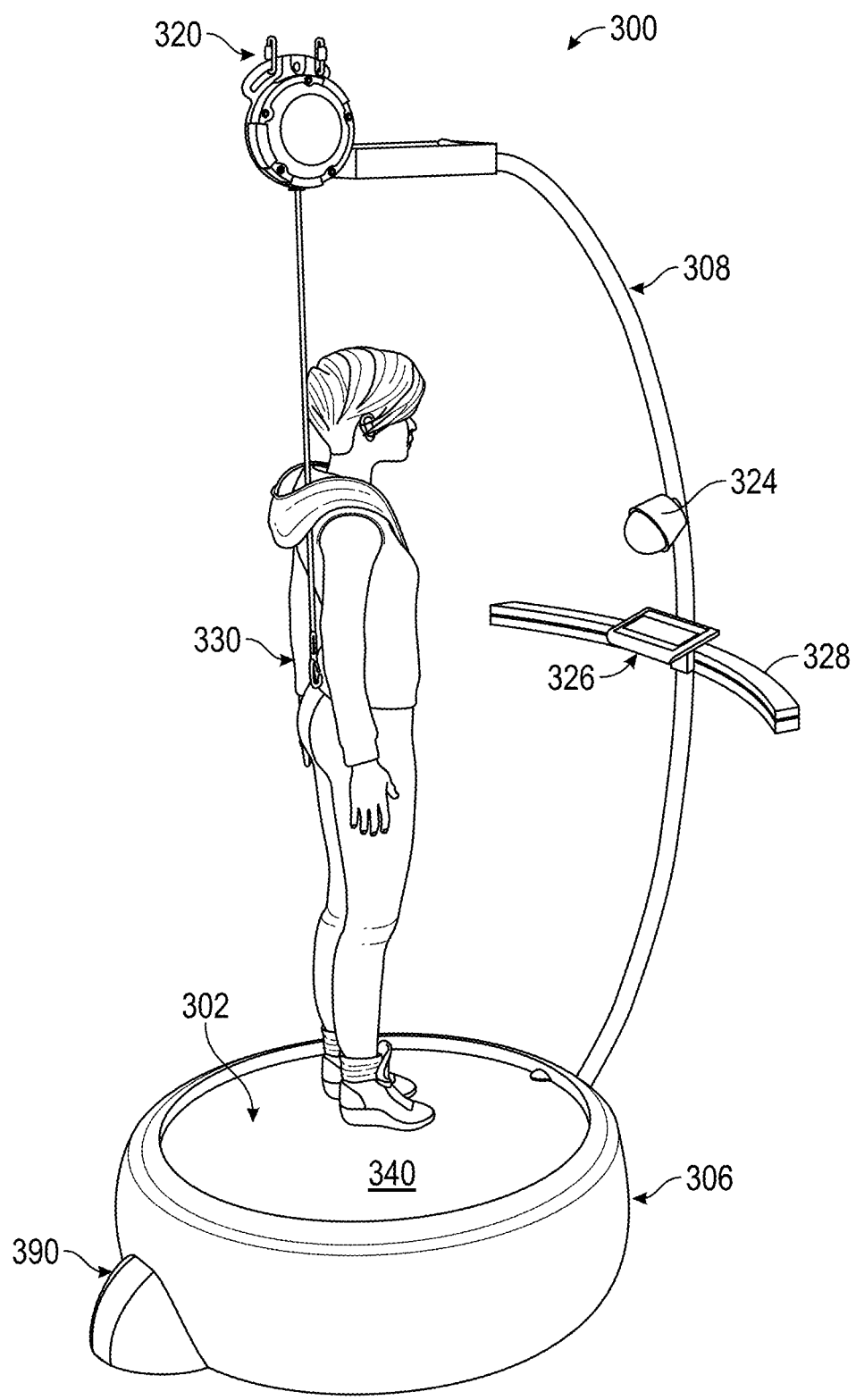
FIG. 13A is a perspective view of another alternative embodiment of a SIMCAST system that includes a telescoping seat, according to this disclosure.
Figure 13B:
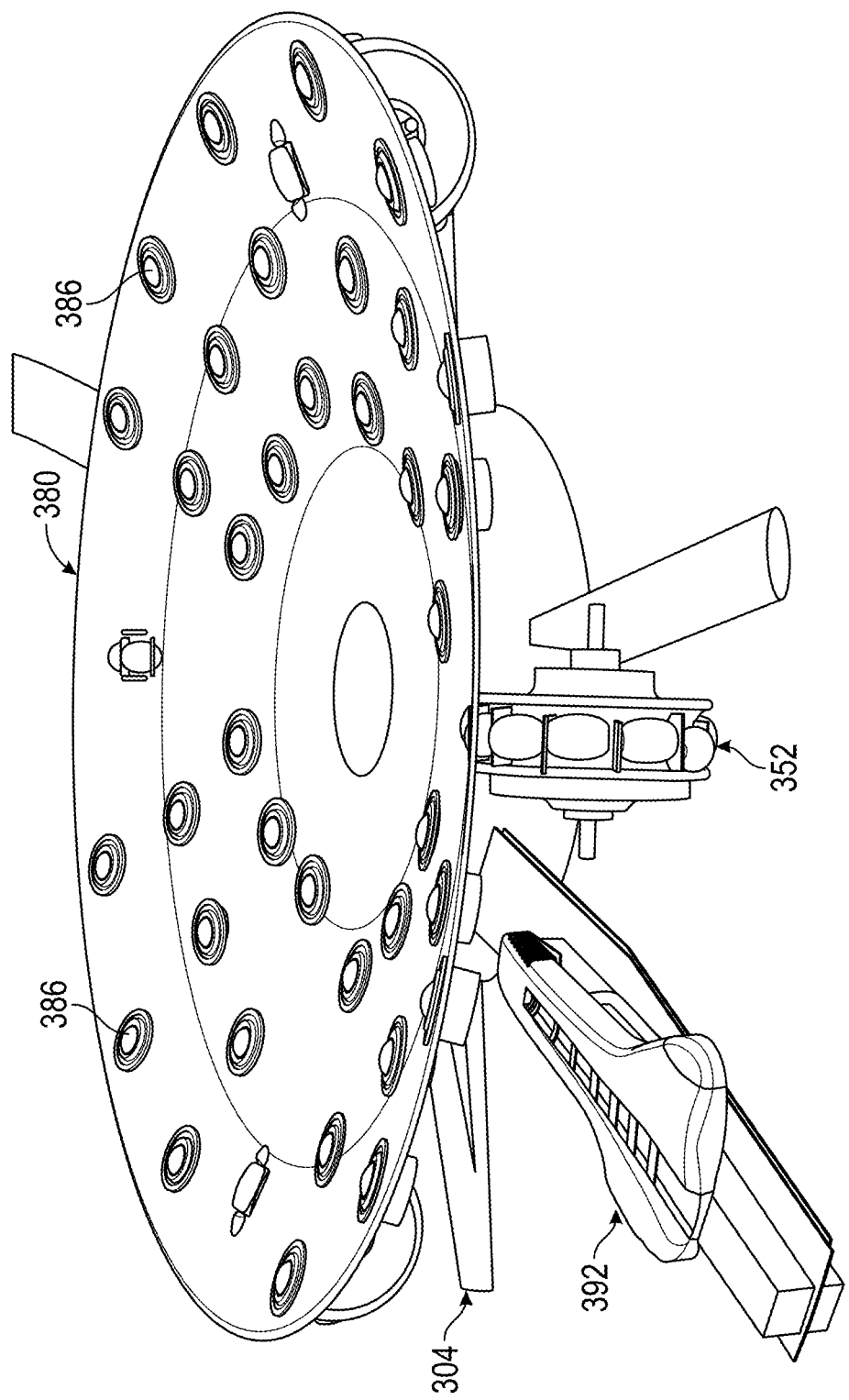
FIG. 13B is a disassembled view of the bottom portion of the SIMCAST system of FIG. 13A, showing the telescoping seat in a fully retracted state, according to this disclosure.

SIMCAST system 300 further includes an automatically deployable customizable telescoping seat (CTS) 392 that extends from base enclosure 308 into the area above IDTP 302. As shown in FIG. 13A, CTS 392 is stored in slotted dust cover 390 at the base of the unit until deployed. FIG. 13B shows CTS 392 in its stored position with dust cover 390 removed. CTS 392 can be deployed or retracted based on voice commands or directions given via control pad 326.

Figure 13C:
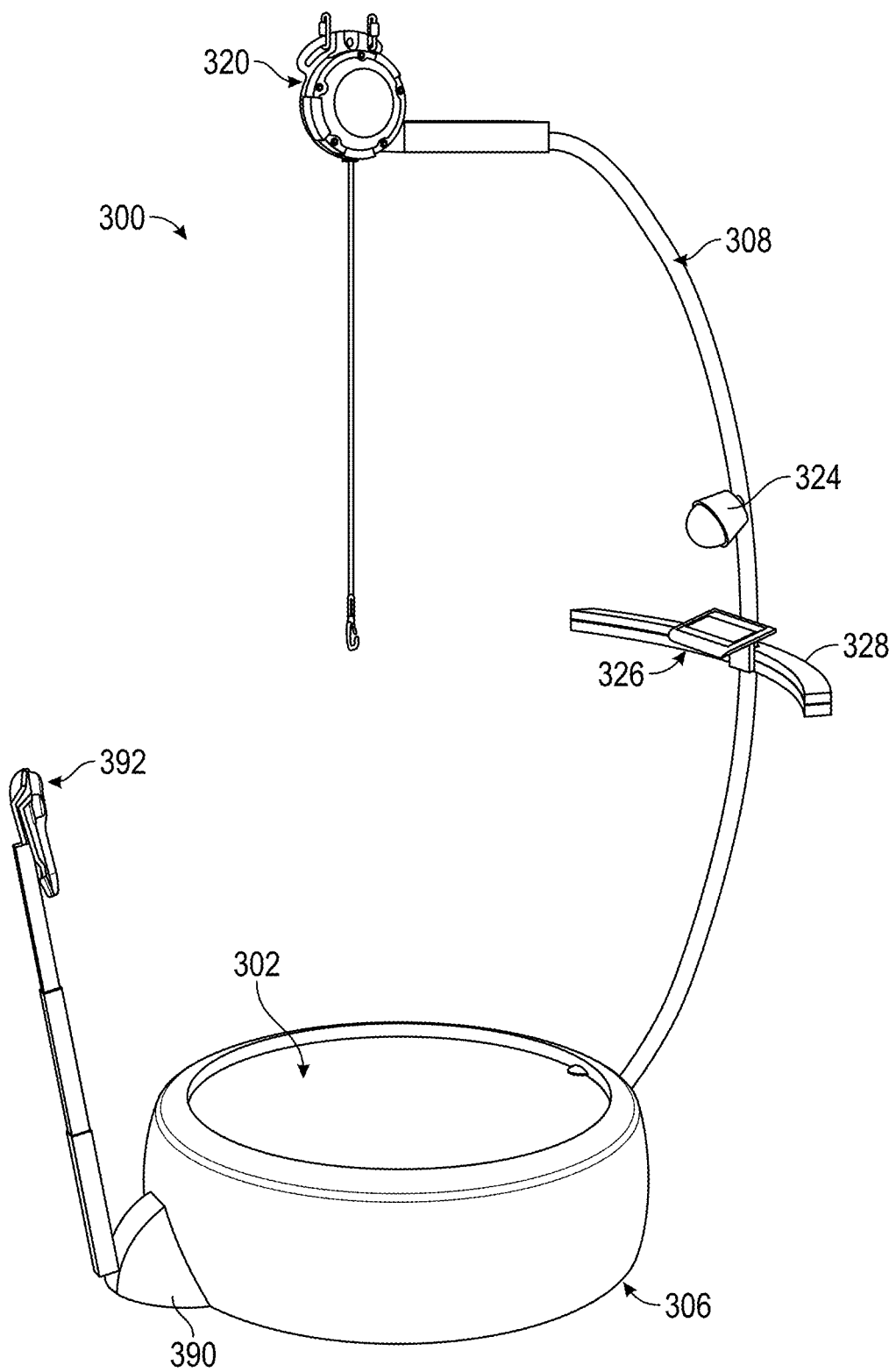
FIG. 13C is a perspective view of the SIMCAST system of FIG. 13A, showing the telescoping seat in a partially extended state, according to this disclosure.
Figure 13D:
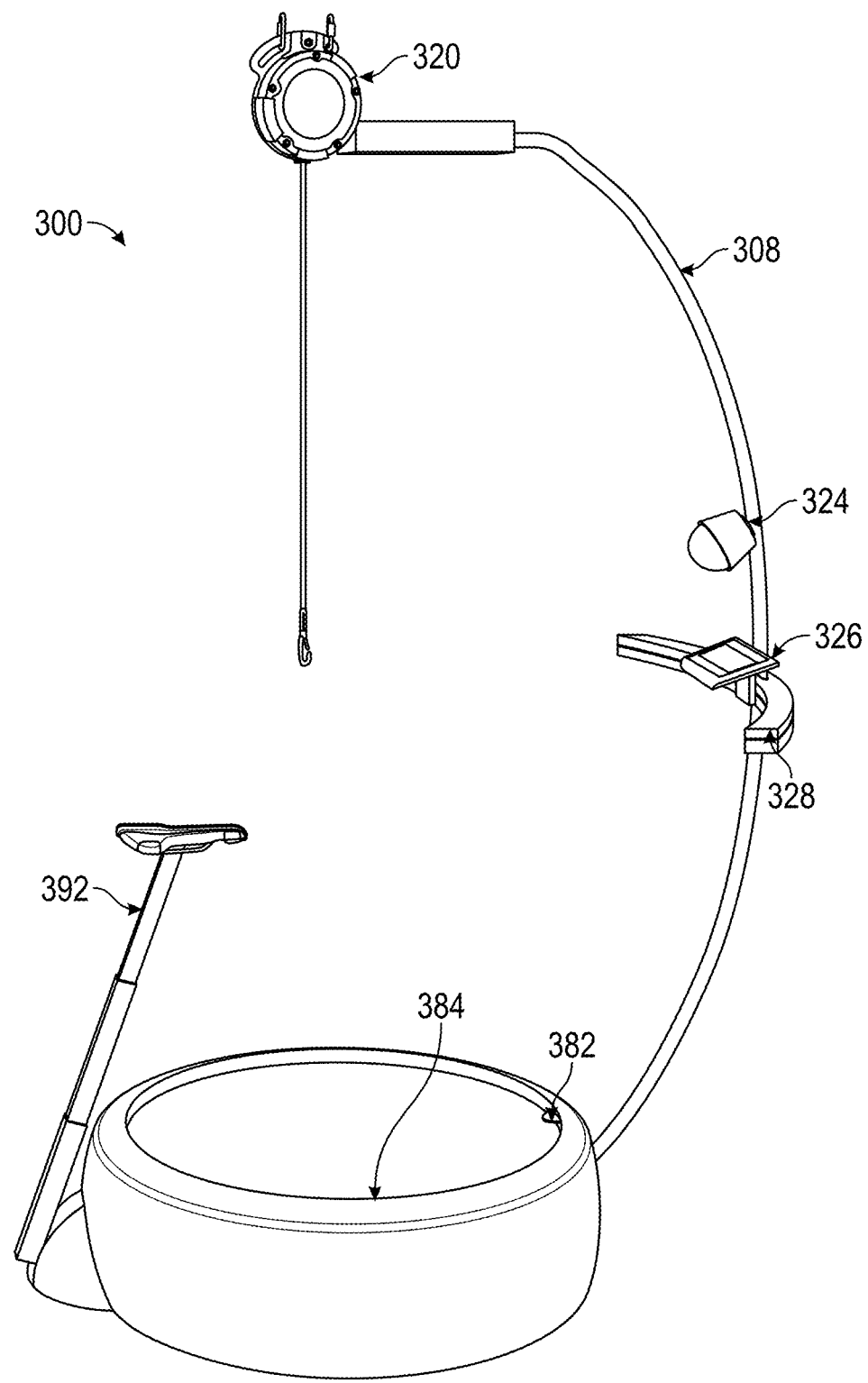
FIG. 13D is a perspective view of the SIMCAST system of FIG. 13A, showing the telescoping seat in a fully extended state, according to this disclosure.

Upon the voice command "Seat Up!" or control pad-initiated direction, CTS 392 deploys upward into an area adjacent to IDTP 302, but out of the user experience area (FIG. 13C). Upon the voice command "Seat In!" or control pad-initiated direction, CTS 392 deploys into the area above IDTP 302, allowing user 330 to sit while engaged in XR activities (FIG. 13D). Upon the voice command "Seat Out!" or control pad-initiated direction, CTS 392 returns to the area outside of IDTP 302, allowing user 330 to engage in activity unencumbered (FIG. 13C). Upon the voice command "Seat Down!" or control pad-initiated direction, CTS 392 returns to storage in dust cover 390 (FIG. 13A).

CTS 392 is customizable in that it may be interchanged with any standard bicycle seat. Thus, SIMCAST system 300 may be used for XR-based cycling activities, especially with the addition of handlebars 328 and a pedal assembly (not shown).

As is apparent from the above description, the SIMCAST system of this disclosure may be used for multiple purposes, including applications involving extended reality. The SIMCAST system enables translation of physical characteristics of a user to a digital environment for users engaging in both extant and emerging extended reality (XR) technologies as well as video gaming. Extended reality includes all mediums of electronically created digital environments including, but not limited to, virtual reality, augmented reality, and mixed reality. Users may use separate interface devices such as the HTVC VIVE, MICROSOFT HOLOLENS 2, APPLE VISION PRO, or other commercially available XR devices to receive external visual and audio sensory stimuli.

The SIMCAST system of this disclosure may be used to create real-time animations of avatars in business or other settings for meetings, workshops, and other collaborative activities. The avatars are not motionless and can advantageously move in multiple directions to make the meeting or collaboration more realistic and meaningful.

The SIMCAST system of this disclosure may be used to create a physical model for individual use in fitting clothes, shoes, sportswear, and other personal wear items while online shopping. CV enabled cameras may create an electronic mapping of the body of the user to digitally dimension the user's body. Photogrammetry may also be used for such electronic mapping.

The SIMCAST system of this disclosure may be used to portray actions of real world individuals in video games and to remotely control physical robots with natural motions. Additional applications include safely and remotely controlling drones, machinery, and other equipment.

The SIMCAST system of this disclosure may be used to remotely view and analyze the motion of an individual remotely for sports medicine, coaching, and other purposes. Additional uses include creation of 3D personnel or professional videos for use in XR and digital media archives, for use in legal testimony or records, and/or for family historical purposes and communication with surviving posterity. The SIMCAST system may be particularly useful for various forms of physical exercise with or without a corresponding avatar. The SIMCAST system may further be used in virtual tourism.

In some embodiments, SIMCAST system 100 translates the static physical geometry of user 130 using CV enabled cameras and/or laser scanning devices mounted on ASST 108 that capture images as user 130 is rotated in the horizontal axis by motion surface 140/400. The captured images of user 130 are processed by control or processing unit 110, which may employ machine learning to determine dimensional characteristics of user 130. Processing unit 110 passes the dimensional characteristics of user 130 to XR translation module 112, which in turn transmits those dimensions to an XR or video gaming platform for use in the design or reproduction of the user's avatar. In some embodiments, SIMCAST system 100 employs a body sock with additional sensors to establish extremely precise physical characteristics and dimensions.

In some embodiments, SIMCAST system 100 translates animated physical motion of user 130 using CV enabled cameras and/or laser scanning devices mounted on ASST 108 and adjacent to treadmill motion surface 140/400 that capture images of user 130 and the user's appendages as user 130 moves over treadmill motion surface 140/400. The images are processed by processing unit 110, which may use machine learning to determine the direction and velocity of user 130 and the user's appendages. Processing unit 110 passes this information to XR translation module 112, which in turn transmits the information to an XR or video gaming platform for use in animating the avatar of user 130.

Another unique feature of SIMCAST system 100 is that treadmill motion surface 140/400 moves in response to locomotion of user 130. System 100 translates the in-motion physical trajectory of user 130 using CV enabled cameras and/or laser scanning devices as noted above. Processing unit 110/MCU 170 may use machine learning to determine the estimated velocity of movement within spatial axes of ambulation of user 130, convert this to motion within the plane of treadmill motion surface 140/400, and to estimate and predict the ensuing footfall. This information is translated by MCU 170 to commands 172 to motor controllers 156 to move surface 140/400 in anticipation of the next steps of user 130. In this sense, moveable surface 140/400 of IDTP 102 anticipates movement of user 130 prior to actual movement of user 130.

The ability to anticipate movement of user 130 before actual footfall allows IDTP 102 to have a smaller moveable surface 140/400 relative to conventional 360 degree treadmills. This is by virtue of use of motors 154 that are controlled by motor controllers 156 rather than switches. Unlike disconnect switches, motor controllers 156 make it possible to start and stop motors 154 without opening both legs of power to motors 154. They allow for controlling motor speeds so that motors 154 do not turn on or turn off. Conventional 360-degree treadmills must have a much larger walking surface to allow users to feel as if they are moving over the walking surface. In contrast, motor controllers 156 of SIMCAST system 100 are able to offer a better experience by adjusting and even anticipating the motion of user 130.

In some embodiments, users can control directional movement in video games, including extended reality/virtual reality games, with their own walking motion rather than with a game controller or joystick. SIMCAST system 100 provides a CV controlled motion surface 140/400 that moves in the reverse direction of intended travel in 360 degrees of direction allowing user 130 to walk in any direction while remaining positionally stationary in a real world location. Fall arrest system 120 protects user 130 while moving on movable surface 140/400.

Figure 14:
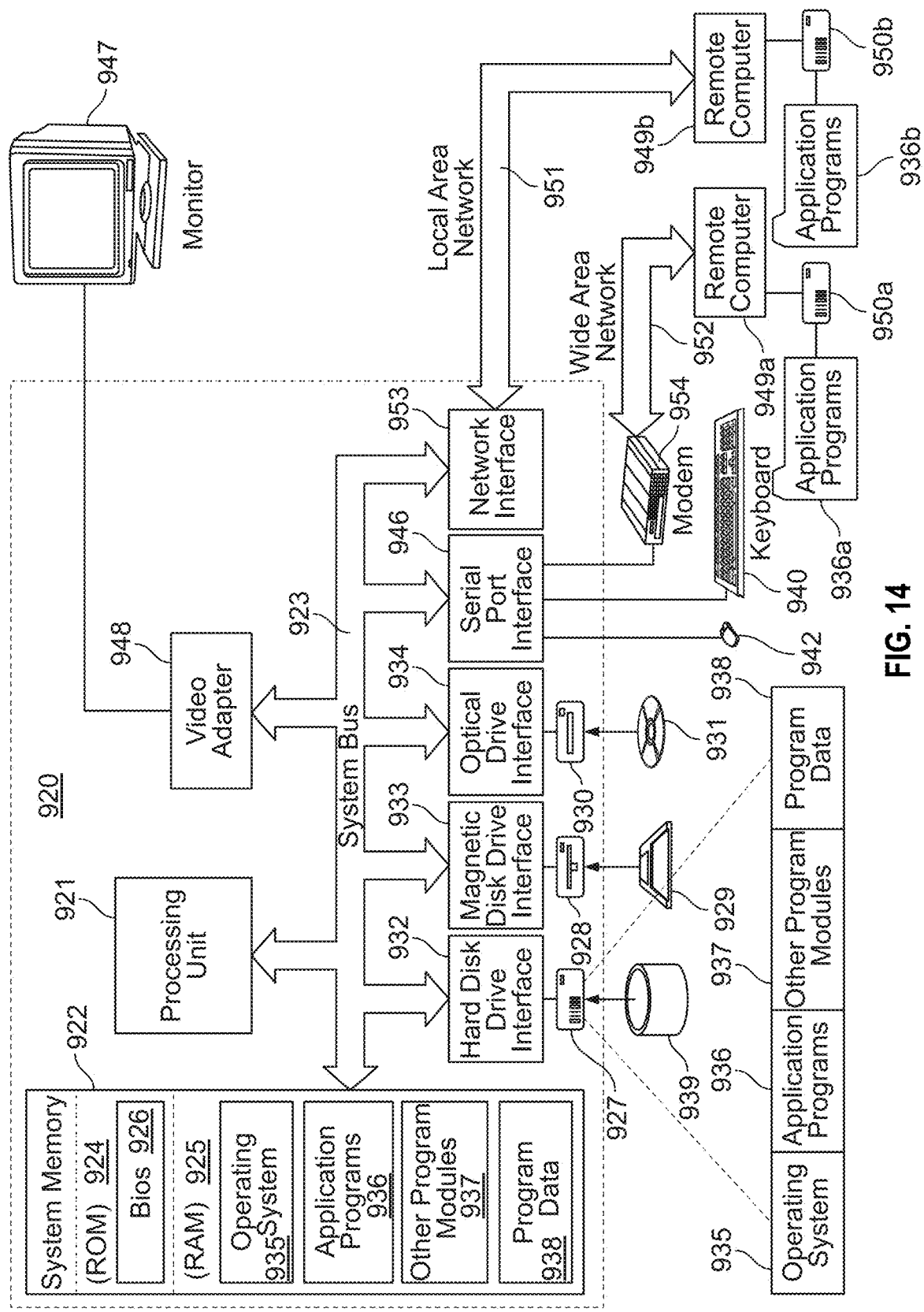
FIG. 14 is a block diagram of an exemplary computing environment in which the SIMCAST system may be implemented.

FIG. 14 is a block diagram of an exemplary computing environment in which the SIMCAST system of FIGS. 1-13D may be implemented. The exemplary computing environment includes a general purpose computing device in the form of a conventional computer 920, including processing unit 921, system memory 922, and system bus 923 that couples various system components including system memory 922 to processing unit 921. It should be noted however, that as mobile phones become more sophisticated, mobile phones are beginning to incorporate many of the components illustrated for computer 920. Accordingly, with relatively minor adjustments, mostly with respect to input/output devices, the description of computer 920 applies equally to mobile phones. System bus 923 may be any of several types of bus structures including a memory bus or memory controller, a peripheral bus, and a local bus using any of a variety of bus architectures. System memory 922 includes read only memory (ROM) 924 and random access memory (RAM) 925. A basic input/output system (BIOS) 926, containing the basic routines that help transfer information between elements within computer 920, such as during start-up, may be stored in ROM 924.

Computer 920 may also include magnetic hard disk drive 927 for reading from and writing to magnetic hard disk 939, magnetic disk drive 928 for reading from or writing to a removable magnetic disk 929, and optical disc drive 930 for reading from or writing to removable optical disc 931 such as a CD ROM or other optical media. Magnetic hard disk drive 927, magnetic disk drive 928, and optical disc drive 930 are connected to system bus 923 by hard disk drive interface 932, magnetic disk drive interface 933, and optical drive interface 934, respectively. The drives and their associated computer-readable media provide nonvolatile storage of computer-executable instructions, data structures, program modules, and other data for the computer 920. Although the exemplary environment described herein employs magnetic hard disk 939, removable magnetic disk 929, and removable optical disc 931, other types of computer readable media for storing data can be used, including magnetic cassettes, flash memory cards, digital versatile discs, Bernoulli cartridges, RAMs, ROMs, and the like.

Program code means comprising one or more program modules may be stored on hard disk 939, magnetic disk 929, optical disc 931, ROM 924, or RAM 925, including operating system 935, one or more application programs 936, other program modules 937, and program data 938. A user may enter commands and information into computer 920 through keyboard 940, pointing device 942, or other input devices (not shown), such as a microphone, joystick, game pad, satellite dish, scanner, motion detectors, or the like. These and other input devices are often connected to processing unit 921 through serial port interface 946 coupled to system bus 923. Alternatively, the input devices may be connected by other interfaces, such as a parallel port, a game port or a universal serial bus (USB). Monitor 947 or another display device is also connected to system bus 923 via an interface, such as video adapter 948. In addition to a monitor, personal computers typically include other peripheral output devices (not shown), such as speakers and printers.

Computer 920 may operate in a networked environment using logical connections to one or more remote computers, such as remote computers 949a and 949b. Remote computers 949a and 949b may each be another personal computer, a server, a router, a network PC, a peer device, or other common network node, and typically include many or all of the elements described above relative to computer 920, although only memory storage devices 950a and 950b and their associated application programs 936a and 936b are illustrated in FIG. 14. The logical connections depicted in FIG. 14 include local area network (LAN) 951 and wide area network (WAN) 952, which are presented by way of example and not limitation. Such networking environments are commonplace in office-wide or enterprise-wide computer networks, intranets, and the Internet.

When used in a LAN networking environment, computer 920 can be connected to local network 951 through network interface or adapter 953. When used in a WAN networking environment, computer 920 may include modem 954, a wireless link, or other means for establishing communications over wide area network 952, such as the Internet. Modem 954, which may be internal or external, is connected to system bus 923 via serial port interface 946. In a networked environment, program modules depicted relative to computer 920, or portions thereof, may be stored in a remote memory storage device. The network connections shown are exemplary and other means of establishing communications over wide area network 952 may be used.

In this specification and the accompanying drawings, reference is made to particular embodiments and features. It is to be understood that this disclosure includes all possible combinations of such embodiments and features. For example, where a feature is disclosed in the context of a particular aspect or embodiment, or a particular claim, that feature can also be used in combination with or in the context of other aspects and embodiments.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted. The term "coupled to" as used herein may refer to a direct or indirect connection.

This description is presented for purposes of illustration but is not exhaustive or limited to the form disclosed. Many modifications and variations will be apparent to those of ordinary skill in the art without departing from the scope and spirit of this disclosure. Thus, this description is to be regarded as illustrative instead of restrictive of the invention.

The invention claimed is:

1. A motion capture and spatial translation system comprising:
   an infinite directional travel platform (IDTP) comprising:
   a vessel having an elliptical lower body and a flat upper body; and
   a treadmill motion surface encapsulating the vessel, wherein the treadmill motion surface comprises:
   an inner layer formed from an elastic material;
   an intermediate layer formed from patches having inelastic compression properties that increase a modulus of elasticity and decrease elongation of the elastic material, wherein each of the patches comprises a plurality of fingers projecting in radial symmetry from a circular central area; and
   an outer layer formed from the elastic material and having embedded materials that increase a coefficient of friction at an exterior surface of the treadmill motion surface; and
   a host frame supporting the IDTP and anchoring wheels that induce movement of the treadmill motion surface relative to the vessel.

2. The motion capture and spatial translation system of claim 1, wherein the elastic material is polyurethane rubber.

3. The motion capture and spatial translation system of claim 2, wherein the inner layer and the outer layer are formed by brush coating liquid polyurethane rubber over the vessel.

4. The motion capture and spatial translation system of claim 1, wherein the patches are formed from a coated polyester mesh having surface perforations to maintain adhesion to the inner layer and the outer layer.

5. The motion capture and spatial translation system of claim 1, wherein the fingers are formed with bulbous ends to improve their anchorage in the elastic material of the inner layer and the outer layer.

6. The motion capture and spatial translation system of claim 1, wherein the patches are arranged in the intermediate layer such that the plurality of fingers interlock with each other.

7. The motion capture and spatial translation system of claim 6, wherein the patches are arranged linearly and interlockingly across the flat upper body of the vessel and around the elliptical lower body of the vessel.

8. The motion capture and spatial translation system of claim 1, wherein the embedded materials of the outer layer comprise ethylene propylene diene monomer (EPDM) granules or styrene-butadiene rubber (SBR) granules.

9. The motion capture and spatial translation system of claim 1, wherein the IDTP further comprises:
an intervening layer of lubricant fluid between the treadmill motion surface and the vessel; and
a port integrated within the vessel to define an enclosed channel extending from the flat upper body through a hollow interior of the vessel to the elliptical lower body for movement of the lubricant fluid from a top to a bottom of the vessel.

10. The motion capture and spatial translation system of claim 1, further comprising lower computer vision (CV) enabled cameras positioned adjacent the treadmill motion surface to capture foot movements of a user.

11. A motion capture and spatial translation system comprising:
an infinite directional travel platform (IDTP) comprising:
a vessel having an elliptical lower body and a flat upper body; and
a treadmill motion surface encapsulating the vessel, wherein the treadmill motion surface comprises:
an inner layer formed from an elastic material;
an intermediate layer formed from patches having inelastic compression properties that increase a modulus of elasticity and decrease elongation of the elastic material; and
an outer layer formed from the elastic material and having embedded materials that increase a coefficient of friction at an exterior surface of the treadmill motion surface;
a host frame supporting the IDTP and anchoring wheels that induce movement of the treadmill motion surface relative to the vessel; and
an automatically deployable telescoping seat that is extendable into and retractable from an area over the IDTP.

12. A motion capture and spatial translation system comprising:
an infinite directional travel platform (IDTP) comprising:
a vessel having an elliptical lower body and a flat upper body; and
a treadmill motion surface encapsulating the vessel, wherein the treadmill motion surface comprises:
an inner layer formed from polyurethane rubber coated over the vessel;
an intermediate layer comprising patches formed from a coated polyester mesh having surface perforations to maintain adhesion to the inner layer and the outer layer, wherein the patches have inelastic compression properties that increase a modulus of elasticity and decrease elongation of the elastic material, wherein each of the patches comprises a plurality of fingers projecting in radial symmetry from a circular central area, and wherein the patches are arranged in the intermediate layer such that the fingers interlock with each other; and
an outer layer formed from polyurethane rubber coated over the inner layer and the intermediate layer and having embedded granules that increase a coefficient of friction at an exterior surface of the treadmill motion surface; and
a host frame supporting the IDTP and anchoring wheels that induce movement of the treadmill motion surface relative to the vessel.

13. The motion capture and spatial translation system of claim 12, wherein the fingers are formed with bulbous ends to improve their anchorage in the elastic material of the inner layer and the outer layer.

14. The motion capture and spatial translation system of claim 12, wherein the patches are arranged linearly and interlockingly across the flat upper body of the vessel and around the elliptical lower body of the vessel.

15. The motion capture and spatial translation system of claim 12, wherein the embedded granules of the outer layer comprise ethylene propylene diene monomer (EPDM) granules or styrene-butadiene rubber (SBR) granules.

16. A treadmill motion surface comprising:
an inner layer formed from an elastic material;
an intermediate layer formed from patches having inelastic compression properties that increase a modulus of elasticity and decrease elongation of the elastic material; and
an outer layer formed from the elastic material and having embedded materials that increase a coefficient of friction at an exterior surface of the treadmill motion surface, wherein
the patches are formed from a coated polyester mesh having surface perforations to maintain adhesion to the inner layer and the outer layer; and
each of the patches comprises a plurality of fingers projecting in radial symmetry from a circular central area, and wherein the patches are arranged in the intermediate layer such that the fingers interlock with each other.

17. The treadmill motion surface of claim 16, wherein the fingers are formed with bulbous ends to improve their anchorage in the elastic material of the inner layer and the outer layer.

18. The treadmill motion surface of claim 16, wherein the embedded materials of the outer layer comprise ethylene propylene diene monomer (EPDM) granules or styrene-butadiene rubber (SBR) granules.

* * * * *